(12) United States Patent
Greywall

(10) Patent No.: US 7,485,870 B2
(45) Date of Patent: Feb. 3, 2009

(54) PNEUMATIC INFRARED DETECTOR

(75) Inventor: Dennis S. Greywall, Whitehouse Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 78 days.

(21) Appl. No.: 11/531,011

(22) Filed: Sep. 12, 2006

(65) Prior Publication Data

US 2008/0272306 A1    Nov. 6, 2008

(51) Int. Cl.
*G01T 1/16* (2006.01)
(52) U.S. Cl. .................................. 250/385.1
(58) Field of Classification Search ............. 250/385.1
See application file for complete search history.

(56) References Cited

U.S. PATENT DOCUMENTS

| | | | | |
|---|---|---|---|---|
| 3,384,749 | A | * | 5/1968 | Golay ..................... 250/472.1 |
| 4,306,150 | A | * | 12/1981 | Dietz ......................... 250/332 |
| 5,501,893 | A | | 3/1996 | Laermer et al. ............. 428/161 |
| 5,629,790 | A | | 5/1997 | Neukermans et al. ....... 359/198 |
| 5,739,538 | A | * | 4/1998 | Sakaue et al. ............... 250/345 |
| 6,201,631 | B1 | | 3/2001 | Greywall .................... 359/245 |
| 6,667,823 | B2 | | 12/2003 | Greywall .................... 359/224 |
| 6,850,354 | B2 | | 2/2005 | Greywall .................... 359/291 |
| 6,876,484 | B2 | | 4/2005 | Greywall .................... 359/291 |
| 6,924,581 | B2 | | 8/2005 | Greywall .................... 310/309 |
| 6,980,339 | B2 | | 12/2005 | Greywall et al. ............ 359/198 |
| 6,995,895 | B2 | | 2/2006 | Greywall .................... 359/290 |
| 7,099,063 | B2 | | 8/2006 | Greywall .................... 359/290 |
| 2006/0152105 | A1 | | 7/2006 | Aksyuk et al. .............. 310/307 |
| 2006/0158484 | A1 | | 7/2006 | Greywall ..................... 347/56 |
| 2006/0228896 | A1 | | 10/2006 | Greywall .................... 438/736 |

OTHER PUBLICATIONS

"Optomechanical Uncooled Infrared Imaging System," by Yang Zhao, Dissertation, University of California, Berkeley, Fall 2002, pp. 1-155.
"Solid State Optical Thermal Imagers," Matthias Wagner et al., Infrared Technologies and Applications XXXIII, Proc. of SPIE, vol. 6542, 65421P, (2007) 0277-786X/07, 10 pages.
"Uncooled Infrared Imaging Using Bitmaterial Microcantilever Arrays," N.V. Lavrik et al., Infrared Technology and Applications XXXII, Proc. of SPIE vol. 6206, 62061K, (2006) 0277-786X/06, 8 pages.
"Optically Readable Bi-Material Infrared Detector," by Tohru Ishizuya et al., Infrared Technology and Applications XXVII, Proceedings of SPIE vol. 4369 (2001), pp. 342-349.
"Uncooled MEMS IR Imagers with Optical Readout and Image Processing," by Nickolay Lavrik et al., Infrared Technology and Applications XXXIII, Proc. of SPIE vol. 6542, 65421E, (2007), 8 pages.
"High Sensitivity Photomechanical MW-LWIR Imaging Using an Uncooled MEMS Microcantilever Array and Optical Readout," by J. Zhao, Infrared Technology and Applications XXXI, Proc. of SPIE vol. 5783, 2005, pp. 506-513.

(Continued)

*Primary Examiner*—David P Porta
*Assistant Examiner*—Marcus H Taningco

(57) ABSTRACT

An infrared (IR) radiation detector adapted to detect IR radiation by measuring pneumatic expansion of a sense chamber that is caused by a temperature increase within that chamber due to the absorbed energy of the IR radiation. A reference chamber mechanically coupled to the sense chamber controls the pneumatic expansion of the sense-chamber. The expansion is detected either electrically or optically.

24 Claims, 23 Drawing Sheets

OTHER PUBLICATIONS

"High Frame Rate Imaging Using Uncooled Optical Readout Photochemical IR Sensor," by Jack P. Salerno, Infrared Technology and Applications XXXIII, Proc. of SPIE vol. 6542, 65421D, (2007), (9 pages).

"160 × 120 Pixels Optically Readable Bimaterial Infrared Detector," by Tohru Ishizuya et al., Nikon Corporation, Photonics Technology Department, Core Technology Center, IEEE 0-7803-71/85-2/02, 2002, pp. 578-581.

"Optomechanical Uncooled Infrared Imaging System: Design, Microfabrication, and Performance," by Yang Zhao et al., Journal of Microelectromechanical Systems, vol. 11, No. 2, Apr. 2002, pp. 136-146.

"High Sensitivity Uncooled Microcantilever Infrared Imaging Arrays," by Scott R. Hunter et al., Presented at the SPIE Defense and Security Symposium, Apr. 19, 2006, Infrared Technology and Applications XXXII, vol. 6206, pp. 1-12.

U.S. Appl. No. 12/180,866, filed Jul. 28, 2008.
U.S. Appl. No. 11/766,430, filed Jun. 21, 2007.
U.S. Appl. No. 11/766,414, filed Jun. 21, 2007.
U.S. Appl. No. 11/713,207, filed Mar. 2, 2007.

"High Sensitivity Uncooled Microcantilever Infrared Imaging Arrays," by Scott R. Hunter et al., Infrared Technology and Applications XXIX, Bjørn F. Andresen, Gabor. F. Fulop, Editors, Proceedings of SPIE vol. 5074, 2003, pp. 469-480.

"Design and Fabrication of a Novel Bimorph Microoptomechanical Sensor," by Si-Hyung Lim et al., Journal of Microelectromechanical Systems, vol. 14, No. 4, Aug. 2005, pp. 683-690.

"Infrared Vision Using Uncooled Optomechanical Camera" by A. Majumdar et al., Proceedings of SPIE, vol. 3948, (2000), 0277-786X/00, pp. 74-79.

"'Self-Leveling' Uncooled Microcantilever Thermal Detector," by J.L. Corbeil et al., Applied Physics Letters, vol. 81, No. 7, Aug. 12, 2002, American Institute of Physics, pp. 1306-1308.

* cited by examiner

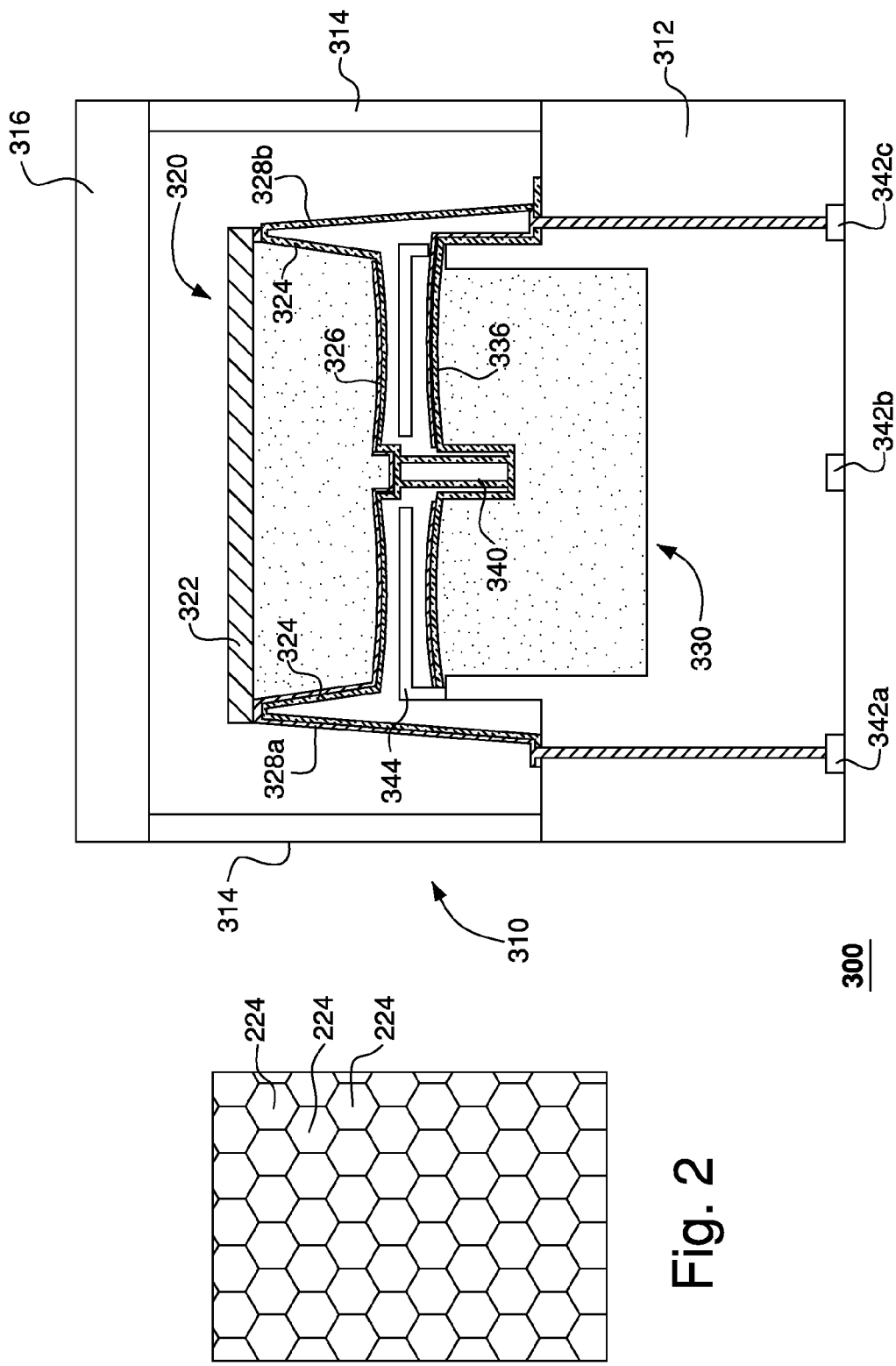

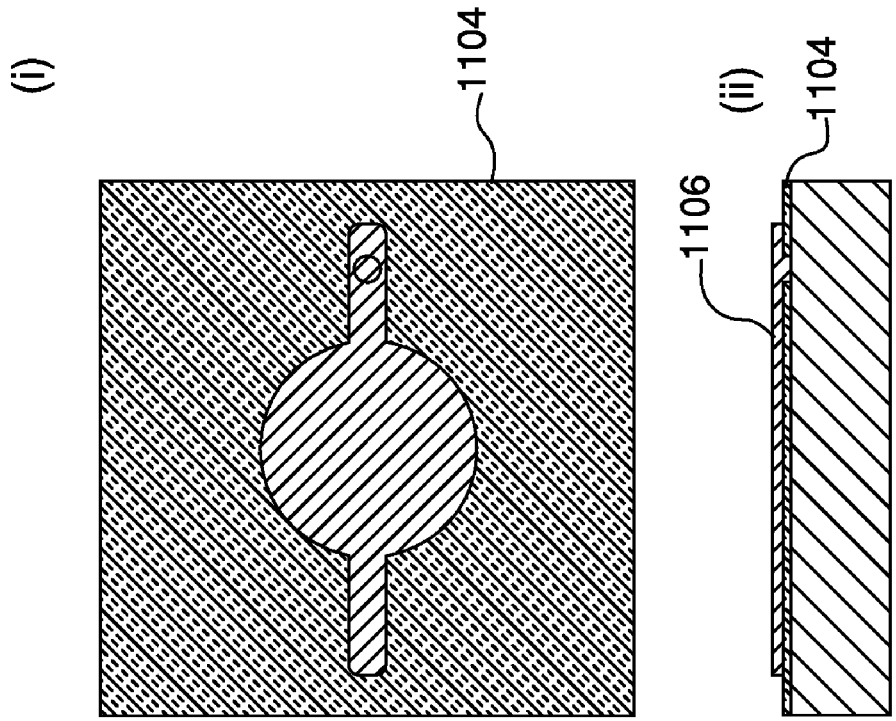
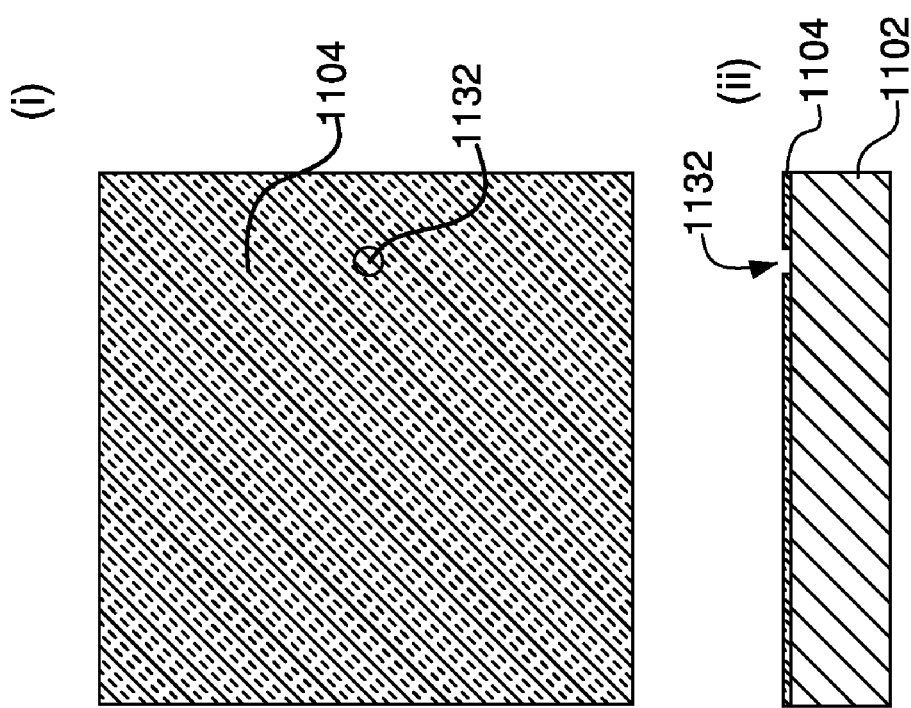
FIG.11B
FIG.11A

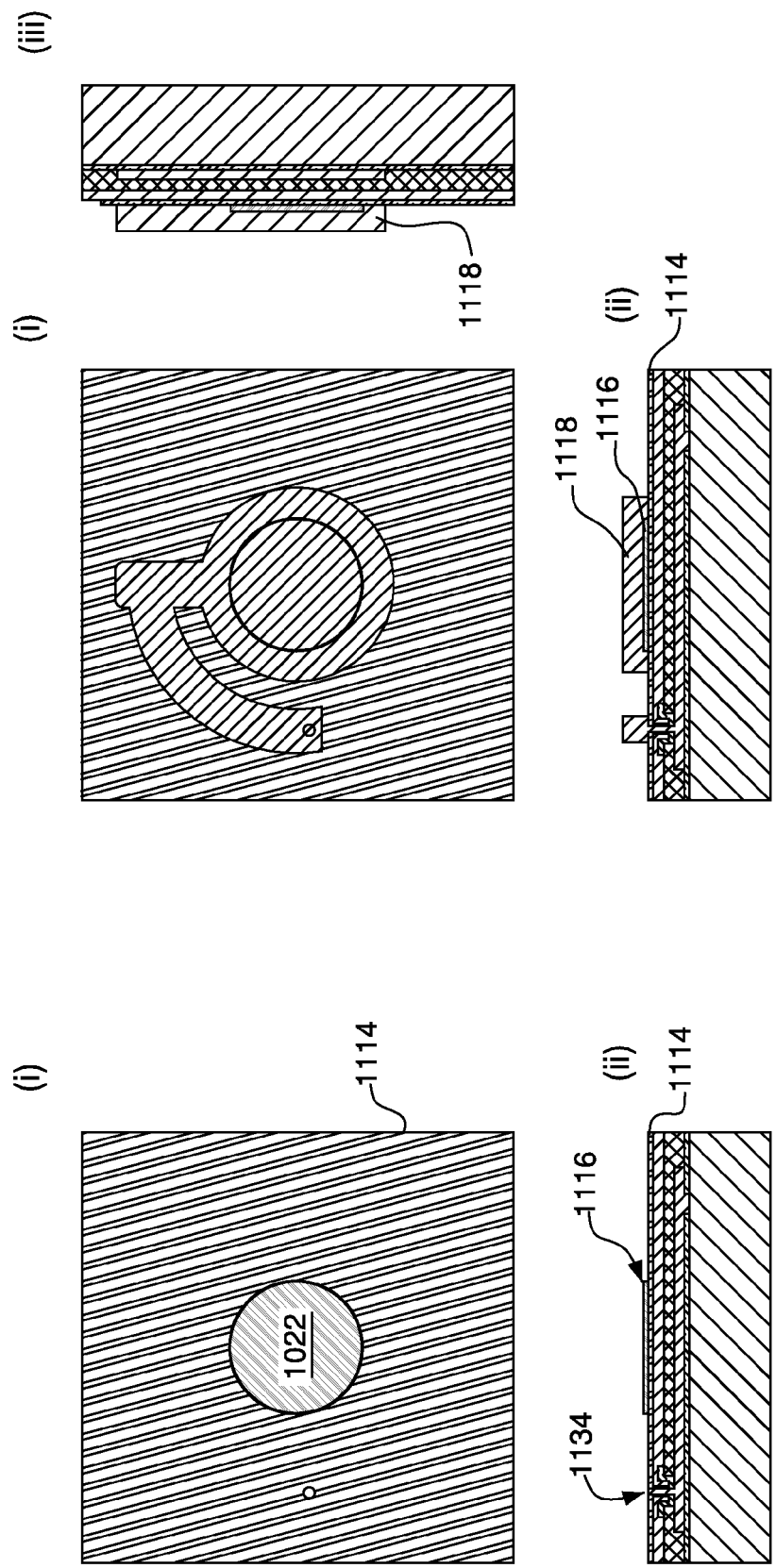

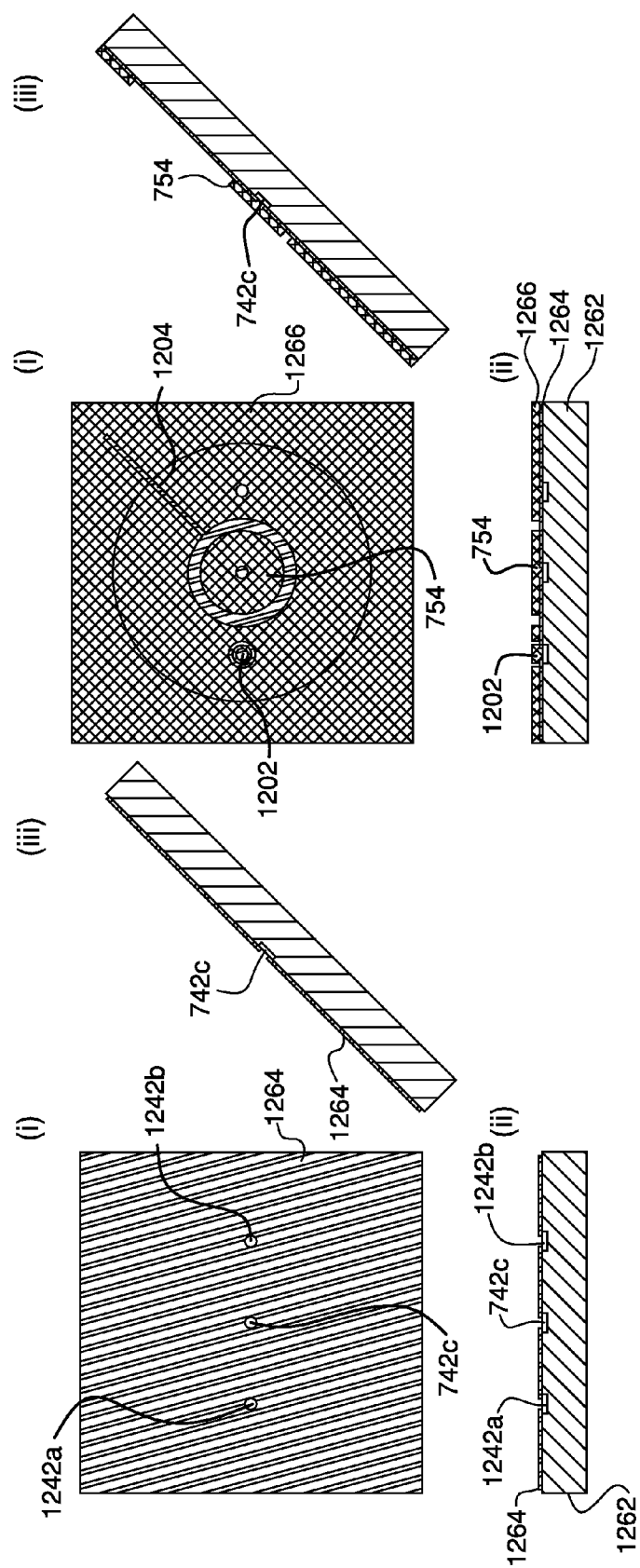

US 7,485,870 B2

PNEUMATIC INFRARED DETECTOR

BACKGROUND OF THE INVENTION

1. Field of the Invention

The present invention relates to detectors of infrared radiation and, more specifically, to thermal detectors of infrared radiation.

2. Description of the Related Art

Infrared (IR) detectors are classified into two categories, photonic and thermal. In a photonic IR detector, infrared photons are absorbed to excite electronic transitions and/or generate photocurrent within an IR absorber, usually a semiconductor material having an appropriate bandgap. The excitation changes material properties of the IR absorber such as, for example, electrical conductivity. This change is measured to quantify the amount of absorbed IR radiation. Photonic IR detectors usually operate at very low temperatures, e.g., about 4 K, to suppress thermally induced electronic transitions and/or thermal "dark" current in the IR absorber. As such, photonic IR detectors utilize cryostats and/or complex cooling systems, which make these detectors heavy, bulky, and relatively expensive.

In a thermal IR detector, the energy of absorbed infrared photons is converted into heat, which causes a temperature increase within the detector. This temperature increase is converted into a mechanical or electrical response, which is measured to quantify the amount of absorbed IR radiation. A sensor employed in a thermal IR detector typically has (i) a resistive bolometer, whose electrical resistance changes with temperature, (ii) a pyroelectric material, which exhibits a spontaneous electric polarization change with temperature, (iii) a thermocouple, whose voltage depends on the thermocouple's temperature differential, and/or (iv) a bi-material cantilever, whose shape is sensitive to temperature changes. Currently, IR detectors employing bi-material cantilevers are among the most sensitive thermal IR detectors.

Unlike photonic IR detectors, thermal IR detectors typically (i) do not use cooling and (ii) operate at temperatures normally present in the environment, e.g., about 300 K. As a result, thermal IR detectors can be light, compact, and relatively inexpensive. However, thermal IR detectors have not yet reached the sensitivity levels accessible to their photonic counterparts.

SUMMARY

Problems in the prior art are addressed by various embodiments of an infrared (IR) radiation detector adapted to detect IR radiation by measuring pneumatic expansion of a sense chamber that is caused by a temperature increase within that chamber due to the absorbed energy of the IR radiation. A reference chamber mechanically coupled to the sense chamber controls the pneumatic expansion of the sense-chamber. The expansion is detected either electrically or optically. Advantageously, some embodiments of IR detectors may provide sensitivity to IR radiation comparable to or better than that of prior-art IR detectors employing bi-material cantilevers and are simpler to implement than those prior-art detectors.

According to one embodiment, the present invention is an apparatus comprising one or more radiation detectors, wherein at least one radiation detector comprises a sense chamber and a reference chamber mechanically coupled to the sense chamber. The sense chamber is adapted to expand in response to receiving IR radiation therein and change volume of the reference chamber due to said expansion and said mechanical coupling. The reference chamber is adapted to restrain the expansion. A volume change with respect to an equilibrium volume for the sense chamber provides a measure of the amount of the IR radiation received.

According to another embodiment, the present invention is a method of detecting radiation comprising detecting a volume change with respect to an equilibrium volume for a sense chamber in a device having a reference chamber mechanically coupled to the sense chamber. The sense chamber is adapted to expand in response to received radiation therein and change volume of the reference chamber due to said expansion and said mechanical coupling. The reference chamber is adapted to restrain the expansion. The volume change provides a measure of the amount of the IR radiation received.

BRIEF DESCRIPTION OF THE DRAWINGS

Other aspects, features, and benefits of the present invention will become more fully apparent from the following detailed description, the appended claims, and the accompanying drawings in which:

FIG. 2 shows a top view of a plurality of pixels of a detector array that can be used in the imaging system shown in FIG. 1 according to one embodiment;

FIG. 3 shows a cross-sectional side view of an IR detector that can be used in an individual pixel of the plurality of pixels shown in FIG. 2 according to one embodiment;

FIGS. 11A-K illustrate representative fabrication steps for the device shown in FIG. 10 according to one embodiment; and FIGS. 12A-M illustrate representative fabrication steps for the device shown in FIG. 7 according to one embodiment.

DETAILED DESCRIPTION

Infrared Detector with Electrical Readout

Figure 1:
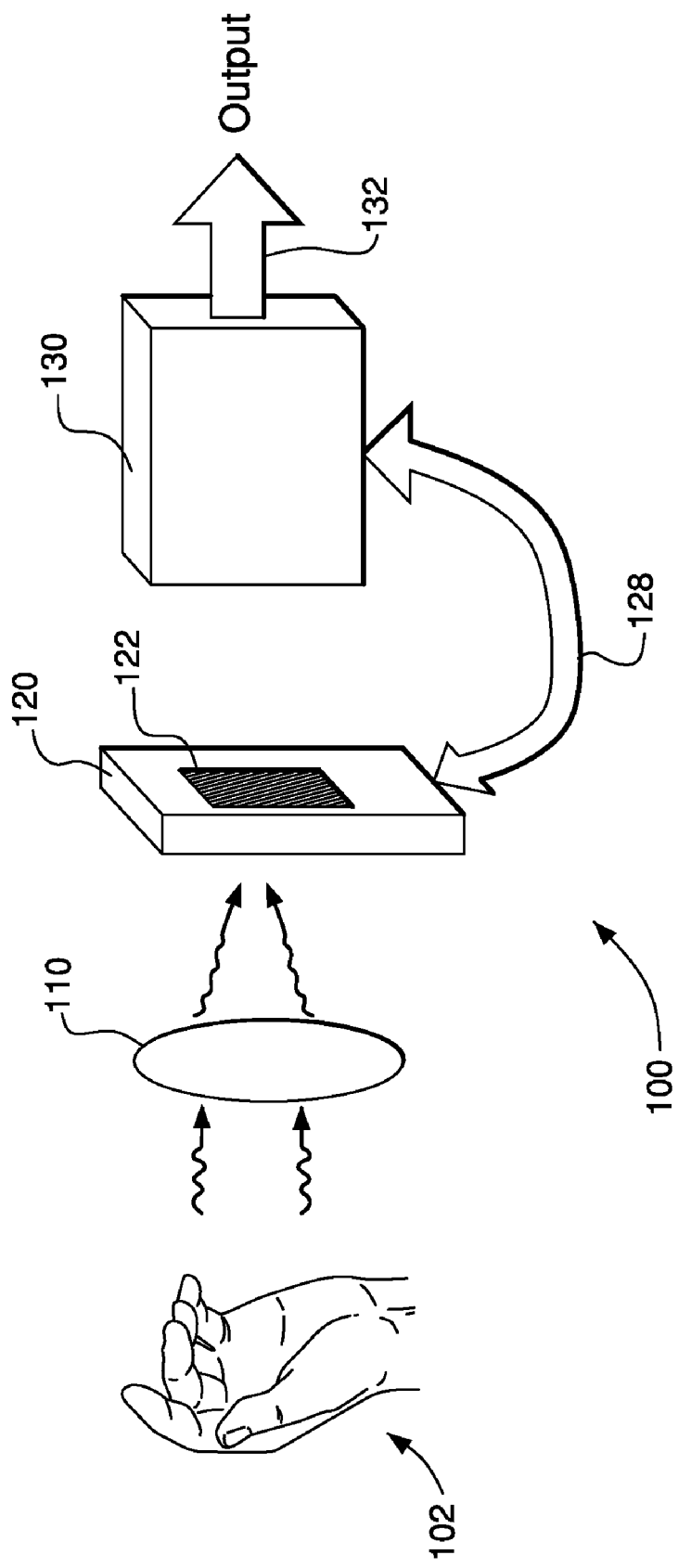
FIG. 1 illustrates a three-dimensional perspective view of an infrared (IR) imaging system according to one embodiment.

FIG. 1 illustrates a three-dimensional perspective view of an infrared (IR) imaging system 100 according to one embodiment. System 100 is depicted as being configured to acquire an IR image of an object 102 (illustratively a human hand), which is not a part of the system. System 100 has an IR lens 110, which projects an image of object 102 onto an IR detector array 120. Array 120 has a plurality 122 of pixels (not individually shown in FIG. 1), each pixel having a thermal IR detector, various embodiments of which are described in more detail below. Each pixel in plurality 122 receives IR radiation corresponding to a respective portion of the image projected by lens 110. A controller 130 electrically coupled via a bus 128 to array 120 configures each pixel to convert the received IR radiation into a respective electrical signal. The electrical signals generated by different pixels of array 120 are read out via bus 128 and provided by controller 130 via an output signal 132 to an external circuit, e.g., a signal processor (not shown). The external circuit(s) can process the signals received from system 100 to generate a representation (e.g., a pseudo-color picture) of the IR image corresponding to object 102.

FIG. 2 shows a top view of a plurality of pixels 224 that can be used in IR detector array 120 of system 100 (FIG. 1) according to one embodiment. Each pixel 224 has a hexagonal shape, which lends itself to good meshing with adjacent pixels for the detector array to have a relatively large (e.g., more than 95%) fill factor. One skilled in the art will appreciate that, in other embodiments, pixels 224 can have other suitable shapes.

FIG. 3 shows a side cross-sectional view of an IR detector 300 that can be used in pixel 224 according to one embodiment. Detector 300 includes an evacuated vessel 310 defined by a base plate 312, walls 314, and an IR-transparent window 316. Inside vessel 310, detector 300 has two mechanically coupled, gas-filled chambers, i.e., a sense chamber 320 and a reference chamber 330. Sense chamber 320 has a rigid plate 322 supported on base plate 312 by support posts 328. Plate 322 is made of a material that can absorb well any IR radiation reaching the plate through window 316 and convert the absorbed radiation into heat. Sense chamber 320 has (i) walls 324 connected to plate 322 and (ii) a flexible diaphragm 326 that seals that chamber. Diaphragm 326 has a thin layer of conducting material (e.g., gold), which is electrically connected via wall 324 and support post 328a to a contact pad 342a.

Reference chamber 330 is defined by a flexible diaphragm 336 that seals an opening formed within base plate 312. Diaphragm 336 is similar to diaphragm 326 and has a thin layer of conducting material, which is electrically connected to a contact pad 342c as shown in FIG. 3. In one embodiment, the volume of reference chamber 330 is significantly larger than the volume of sense chamber 320.

Diaphragms 326 and 336 are mechanically coupled to one another by a rigid hollow beam 340 that is attached between middle sections of the diaphragms. Beam 340 serves to mechanically transfer any motion of diaphragm 326 to diaphragm 336 and vice versa. Beam 340 and support posts 328 are made of materials having relatively low thermal conductivity to provide good thermal insulation for sense chamber 320 from reference chamber 330 and the periphery of vessel 310.

Between diaphragms 326 and 336, detector 300 has a rigid conductive plate 344 that is fixedly attached to base plate 312. Base plate 312 incorporates a conductive path (not explicitly shown in FIG. 3), which electrically connects plate 344 to a contact pad 342b. Plate 344 and diaphragm 326 form a first capacitor, for which contact pads 342a-b serve as electrical leads. Plate 344 and diaphragm 336 form a second capacitor, for which contact pads 342b-c similarly serve as electrical leads.

In one embodiment, plate 344 is positioned between diaphragms 326 and 336 so that, at equilibrium, i.e., when chambers 320 and 330 have the same temperature and pressure, the first and second capacitors have substantially equal capacitances. With relatively slow variations in ambient temperature, the pressures and temperatures in chambers 320 and 330 track each other and there is substantially no motion of diaphragms 326 and 336 with respect to plate 344. However, when IR radiation impinges upon plate 322 (e.g., due to the imaging of object 102, as depicted in FIG. 1), the IR radiation warms up the plate relatively quickly, which in turn warms up the gas inside sense chamber 320. An increase in gas temperature causes a corresponding increase in gas pressure in sense chamber 320, which increases the force acting upon beam 340 from the sense chamber. Since reference chamber 330 does not directly receive IR radiation through window 316, the reference chamber remains at ambient temperature, and gas pressure inside the reference chamber remains substantially unchanged. As a result, no additional force to counteract the force increase generated by the pressure increase in sense chamber 320 is generated in reference chamber 330. The resulting force imbalance causes (i) sense chamber 320 to expand via deformation of diaphragm 326 and (ii) reference chamber 330 to resist that expansion, while it contracts via deformation of diaphragm 336, until the forces acting upon beam 340 from the sense and reference chambers equalize. After the force equalization, diaphragms 326 and 336 have changed their positions with respect to plate 344, thereby producing capacitance changes for the first and second capacitors. These capacitance changes are measured to quantify the volume change for sense chamber 320, which can then be used to quantify the amount of IR radiation received by plate 322 via window 316.

Figure 4:
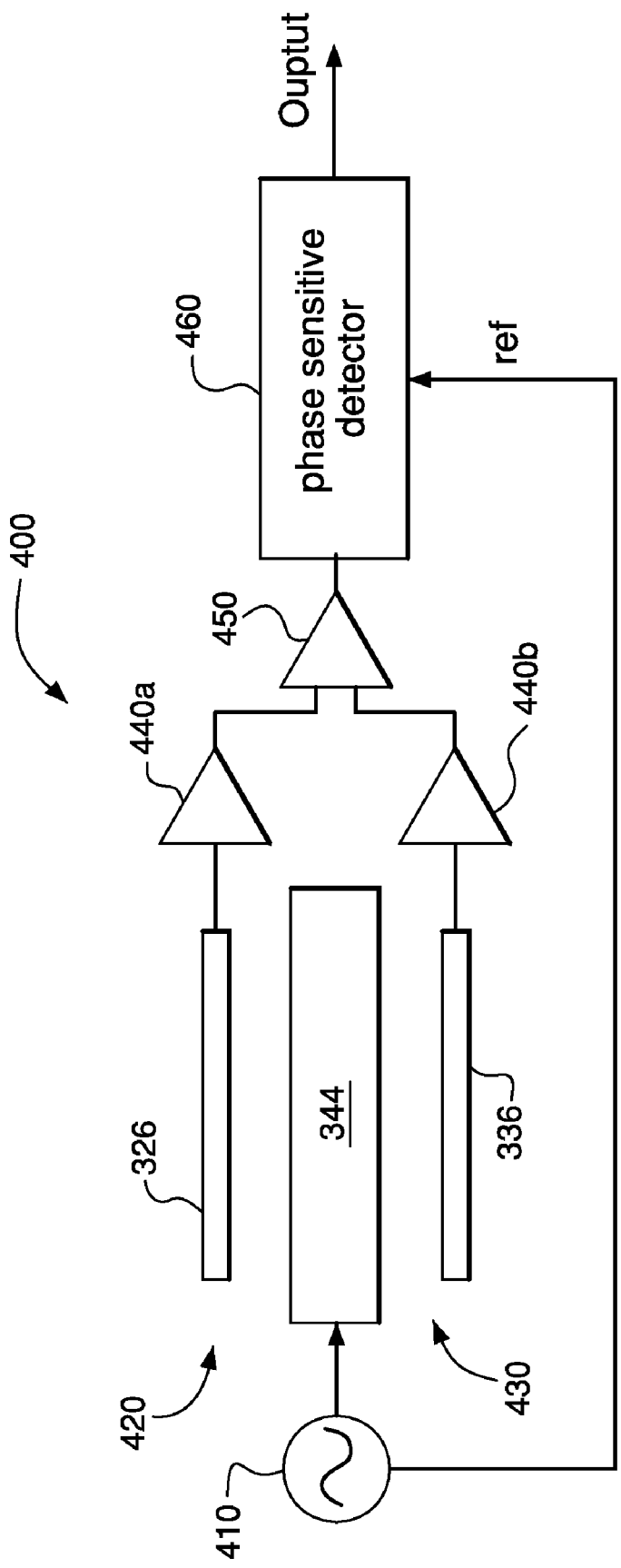
FIG. 4 shows a block diagram of a circuit that can be used to measure capacitance changes in the IR detector shown in FIG. 3 according to one embodiment.

FIG. 4 shows a block diagram of a circuit 400 that can be used in controller 130 of system 100 (FIG. 1) to measure capacitance changes in IR detector 300 (FIG. 3) according to one embodiment. Circuit 400 has an ac voltage source 410 that is configured to drive current through capacitors 420 and 430 formed by plate 344 and diaphragms 326 and 336, respectively, of detector 300 (see also FIG. 3). The current is amplified by amplifiers 440a-b, the outputs of which are applied to a differential amplifier 450. The output of differential amplifier 450 is in turn applied to a phase-sensitive (e.g., lock-in) detector 460, where the amplitude of the differential output is measured using the ac voltage generated by source 410 as a reference signal.

As already explained above in the context of FIG. 3, at equilibrium, capacitor 420 and capacitor 430 have substantially equal capacitances. As a result, the signals applied to differential amplifier 450 by amplifiers 440a-b have equal amplitudes causing the differential output to be zero. However, when there is a capacitance change for capacitors 420 and 430 caused by IR radiation, the signals applied to differential amplifier 450 by amplifiers 440a-b no longer have equal amplitudes, with the amplitude difference reflecting the extent of displacement of diaphragms 326 and 336 with respect to their positions at equilibrium. The amplitude difference is amplified by amplifier 450 and measured by detector 460 to quantify the amount of IR radiation received by sense chamber 320.

Referring back to FIG. 3, we now characterize the sensitivity of IR detector 300 and compare it with the sensitivity of prior-art thermal IR detectors. Let us consider first a rigid cylindrical chamber of radius R that is sealed with a thin unstressed diaphragm of thickness t. A difference $\Delta P$ between the inside pressure and the outside (ambient) pressure causes a bulging of the diaphragm. If t<<R, then the total volume (V) of the cylindrical chamber is given by Eq (1):

$$V = \pi R^2 (h + u_{mp}/3) \tag{1}$$

where h is the height of the cylindrical chamber, and $u_{mp} = \beta \Delta P$ is the height of the bulge, where $$\beta \equiv \frac{3}{16} \frac{(1-\sigma^2)}{E} \frac{R^4}{t^3},$$

with E being the Young's modulus of the diaphragm's material and $\sigma$ being the Poisson's ratio.

Let us assume now that the cylindrical chamber is filled with an ideal gas and placed inside a large gas-filled vessel that is maintained at temperature $T_0$ and pressure $P_0$. If gas temperature and pressure in the cylindrical chamber are $T_0+\delta T$ and $P_0+\delta P$, respectively, then the following is true:

$$1 + \frac{\delta u_{mp}}{3h} = \frac{1 + \frac{\delta T}{T_o}}{1 + \frac{\delta u_{mp}}{\beta P_o}} \quad (2)$$

where $\delta u_{mp} = \beta \delta P$. Solving Eq. (2) for $\delta u_{mp}$, one finds that:

$$\delta u_{mp} = \frac{3h}{2}\left(\sqrt{\left(1 + \frac{\beta P_o}{3h}\right)^2 + 4\frac{\beta P_o}{3h}\frac{\delta T}{T_o}} - \left(1 + \frac{\beta P_o}{3h}\right)\right) \quad (3)$$

Figure 5:
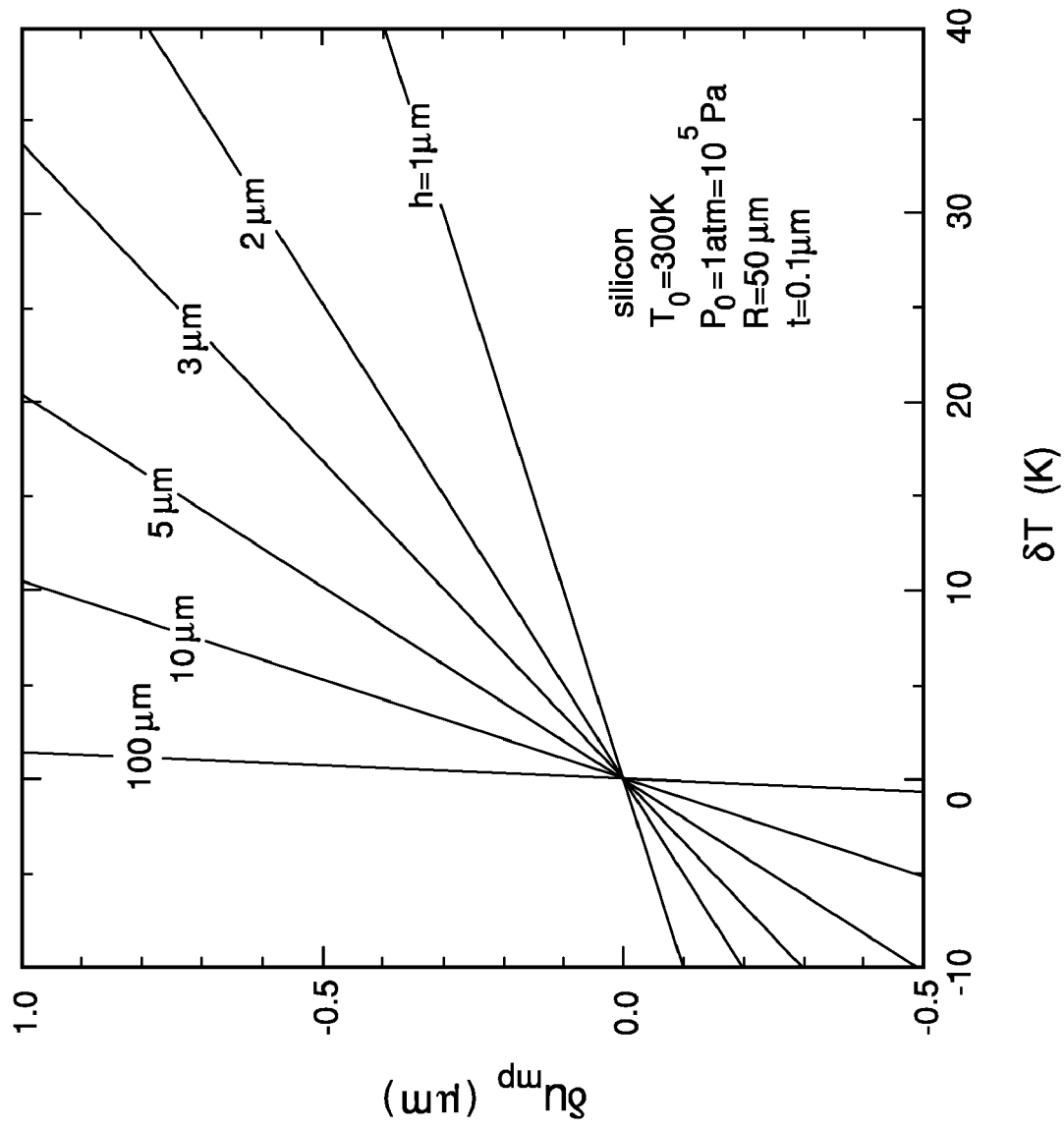
FIG. 5 graphically illustrates bulging of a cylindrical chamber, which can be used in the IR detector of FIG. 3, as a function of the height of that chamber.

FIG. 5 graphically illustrates the bulging of a cylindrical chamber described by Eq. (3) in response to warming or cooling of that chamber with respect to the surrounding vessel. More specifically, FIG. 5 shows $\delta u_{mp}$ versus $\delta T$ for several values of h, which values are indicated next to the corresponding response curves in FIG. 5. The data of FIG. 5 also assume that (i) the diaphragm of the cylindrical chamber is made of silicon and has a thickness of 0.1 μm, (ii) the cylindrical chamber has a radius of 50 μm, and (iii) the pressure and temperature in the vessel surrounding the cylindrical chamber are 1 atm and 300 K, respectively.

The data of FIG. 5 indicate that the magnitude of the pneumatic response of the cylindrical chamber increases with an increase of h. In an asymptotic case of very large h, i.e., when the volume of the bulge is much smaller than the total volume of the cylindrical chamber (see also Eq. (1)), Eq. (3) can be transformed into Eq. (4):

$$\alpha \equiv \frac{\delta u_{mp}}{\delta T} \approx \beta \frac{P_0}{T_o} \quad (4)$$

where $\alpha$ is a coefficient quantifying the pneumatic response of the cylindrical chamber to a temperature change, which coefficient characterizes the sensitivity of the IR detector employing that cylindrical chamber as a thermal sensor. For the data of FIG. 5, the maximum (asymptotic) sensitivity is about 3 μm/K. Note that this maximum sensitivity value is about an order of magnitude larger than that of bi-material cantilevers used in some of the most sensitive prior-art thermal IR detectors.

Using the data of FIG. 5, we now turn to the characterization of detector 300. First we note that sense chamber 320 of detector 300 is placed inside evacuated vessel 310, rather than inside a large gas-filled vessel, as assumed for FIG. 5. However, the effect of beam 340, which mechanically couples reference chamber 330 and sense chamber 320 in detector 300, is substantially equivalent to the effect of having the sense chamber inside a gas-filled vessel with gas temperature and pressure of the reference chamber. Still, one difference between the situation illustrated by FIG. 5 and that of detector 300 is that FIG. 5 corresponds to a cylindrical chamber having one flexible diaphragm, while mechanically coupled chambers 320 and 330 in detector 300 together have two such diaphragms. As a result, a factor of one half needs to be applied to the thermal response curves shown in FIG. 5 before they can be used for the characterization of detector 300.

If detector 300 is implemented as a MEMS device, then the MEMS fabrication technology imposes some limits on the range of h values that are practical for detector 300. More specifically, the upper limit for h is likely to be on the order of 100 μm. For comparison, the above-mentioned maximum value of $\alpha$ (=3 μm/K) corresponds to values of h that are large compared to 660 μm (a parameter obtained by multiplying the value of $\beta$ for the silicon diaphragm and gas pressure $P_0$=1 atm). As a result, detector 300 implemented as a MEMS device is likely to have a sensitivity value that is smaller than that maximum value of $\alpha$. For example, detector 300 will have a sensitivity value of about 0.2 μm/K, when sense chamber 320 has the following dimensions: h=30 μm, R=50 μm, and t=0.1 μm, and is filled with gas at $T_0$=300 K and $P_0$=2 atm. Note, however, that this sensitivity value is still comparable to or better than that of prior-art thermal IR detectors employing bi-material cantilevers.

Figure 6:
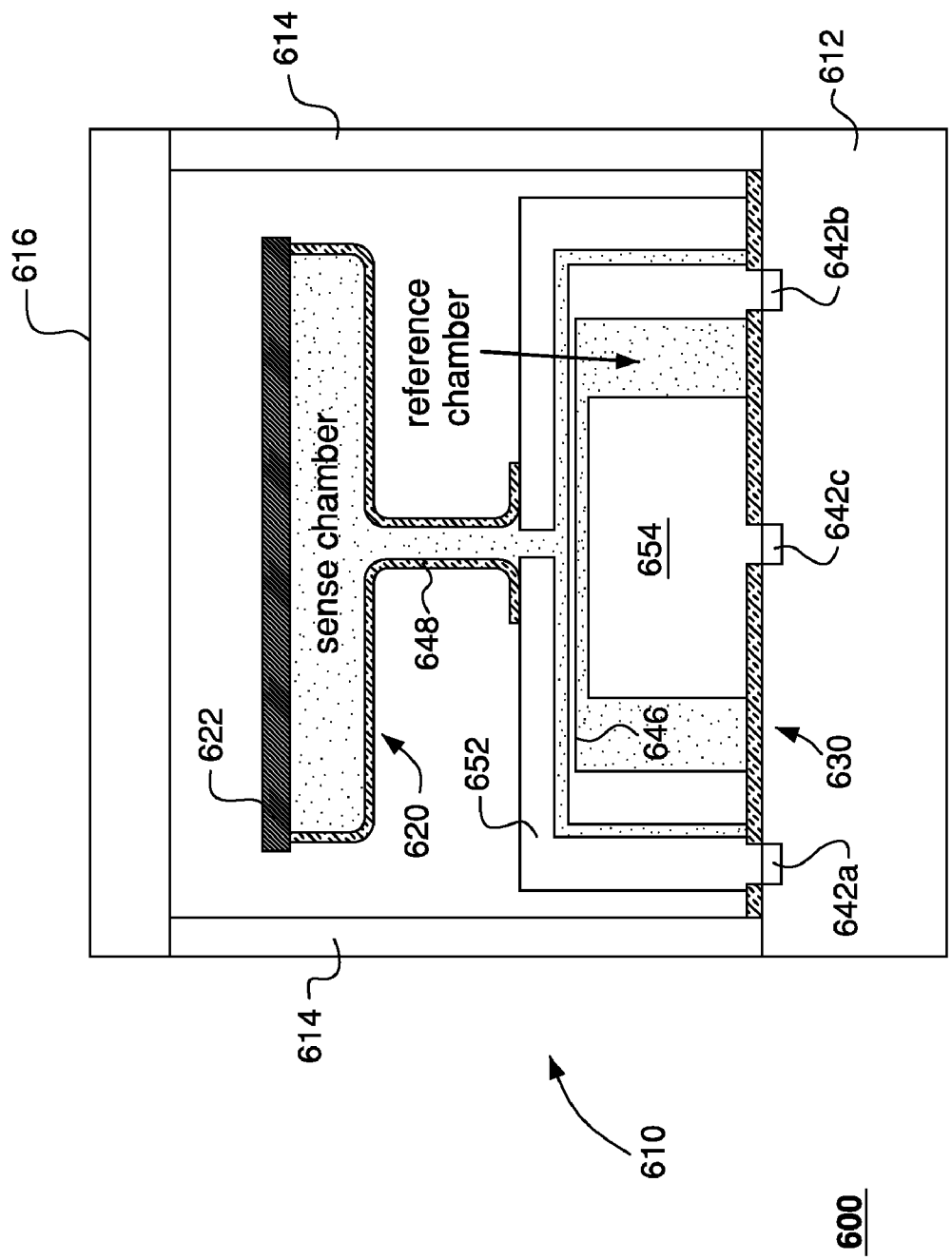
FIG. 6 shows a side cross-sectional view of an IR detector that can be used in an individual pixel of the plurality of pixels shown in FIG. 2 according to another embodiment.

FIG. 6 shows a cross-sectional side view of an IR detector 600 that can be used in pixel 224 (FIG. 2) according to another embodiment. The physical principle of operation for detector 600 is similar to that of detector 300. As such, detector 600 has many structural elements that are analogous to those of detector 300. In FIGS. 3 and 6, analogous structural elements of the two detectors are designated with labels having the same last two digits. The following portion of this specification primarily focuses on structural differences between detectors 300 and 600.

One difference between detectors 300 and 600 is that, in the latter detector, sense chamber 620 and reference chamber 630 share a single flexible diaphragm 646, as opposed to having two separate flexible diaphragms mechanically coupled by a hollow beam, as in detector 300. To reduce heat exchange between chambers 620 and 630 through the shared diaphragm, sense chamber 620 has a relatively long and narrow tube 648 connecting the chamber's relatively large upper portion located near plate 622 with the chamber's relatively small lower portion located near diaphragm 646. Tube 648 enables pressure equalization between the upper and lower portions of sense chamber 620, while substantially preserving any existing temperature differential between those portions. As a result, the lower portion of sense chamber 620 can remain at substantially the same temperature as reference chamber 630, thereby inhibiting heat transfer between the sense and reference chambers.

Diaphragm 646 and a plate 652 capping the lower portion of sense chamber 620 form a first capacitor in detector 600, which first capacitor is analogous to capacitor 420 of FIG. 4. Similarly, diaphragm 646 and a plate 654 of reference chamber 630 form a second capacitor in detector 600, which second capacitor is analogous to capacitor 430 of FIG. 4. However, the first and second capacitors of detector 600 differ from capacitors 420 and 430 of detector 300 in that, in the latter detector, the capacitor plate shared by capacitors 420 and 430 (i.e., plate 344) is fixed and the non-shared capacitor plates of those capacitors (i.e., diaphragms 326 and 336) are movable, while, in the former detector, the capacitor plate shared by the first and second capacitors (i.e., diaphragm 646) is movable and the non-shared capacitor plates of those capacitors (i.e., plates 652 and 654) are fixed. Similar to contact pads 342*a-c*, which provide electrical leads to capacitors 420 and 430 of detector 300, contact pads 642*a-c* provide electrical leads to the first and second capacitors of detector 600. As such, contact pads 642*a-c* can be used to connect detector 600 to circuit 400 in substantially the same manner as contact pads 342*a-c* (see FIGS. 3 and 4).

Figure 7A:
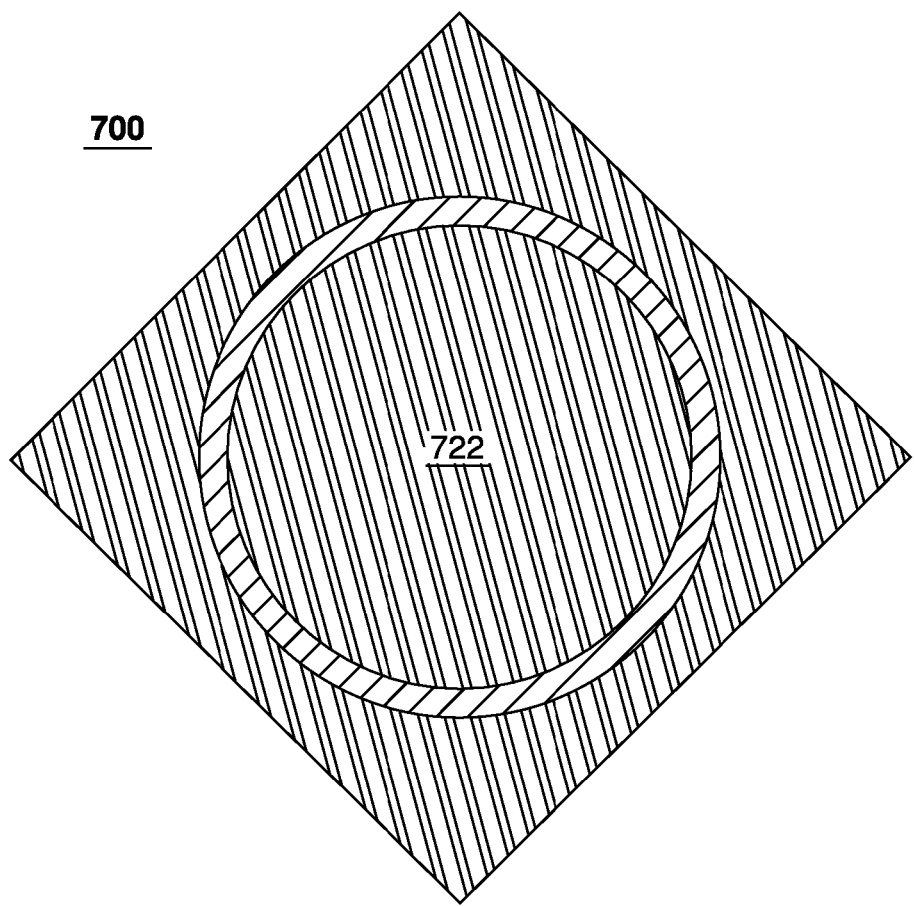
FIGS. 7A-B show a MEMS device that can be used in the IR detector shown in FIG. 6 according to yet another embodiment.
Figure 7B:
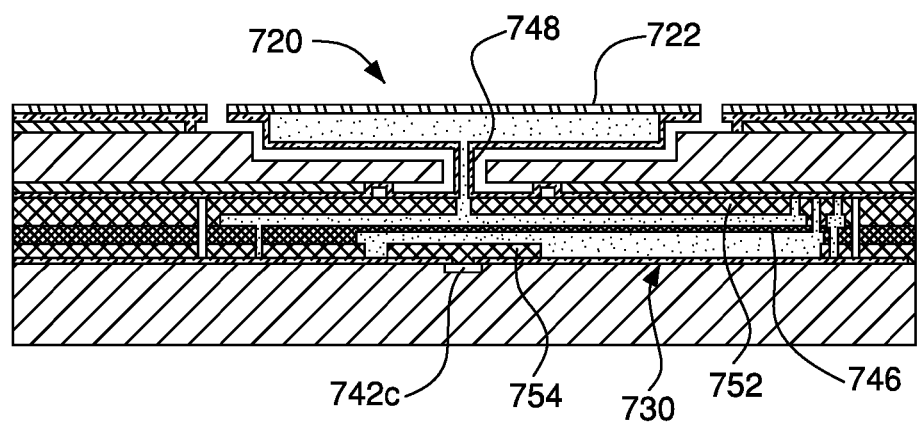

FIGS. 7A-B show a MEMS device 700 that can be used in IR detector 600 (FIG. 6) according to yet another embodiment. More specifically, FIG. 7A shows a top view of device 700, and FIG. 7B shows a cross-sectional side view of device 700. Device 700 is generally analogous to IR detector 600 and, in FIGS. 6 and 7, analogous structural elements of the two devices are designated with labels having the same last two digits. However, one difference between detector 600 and device 700 is that the latter does not have an evacuated vessel analogous to vessel 610. One skilled in the art will appreciate that any suitable evacuated vessel can be used to host device 700 and make it fully analogous to detector 600. For additional description of device 700, the reader is referred to the fabrication section of this specification, where representative fabrication steps for device 700 are described in detail.

Infrared Detector with Optical Readout

Figure 8:
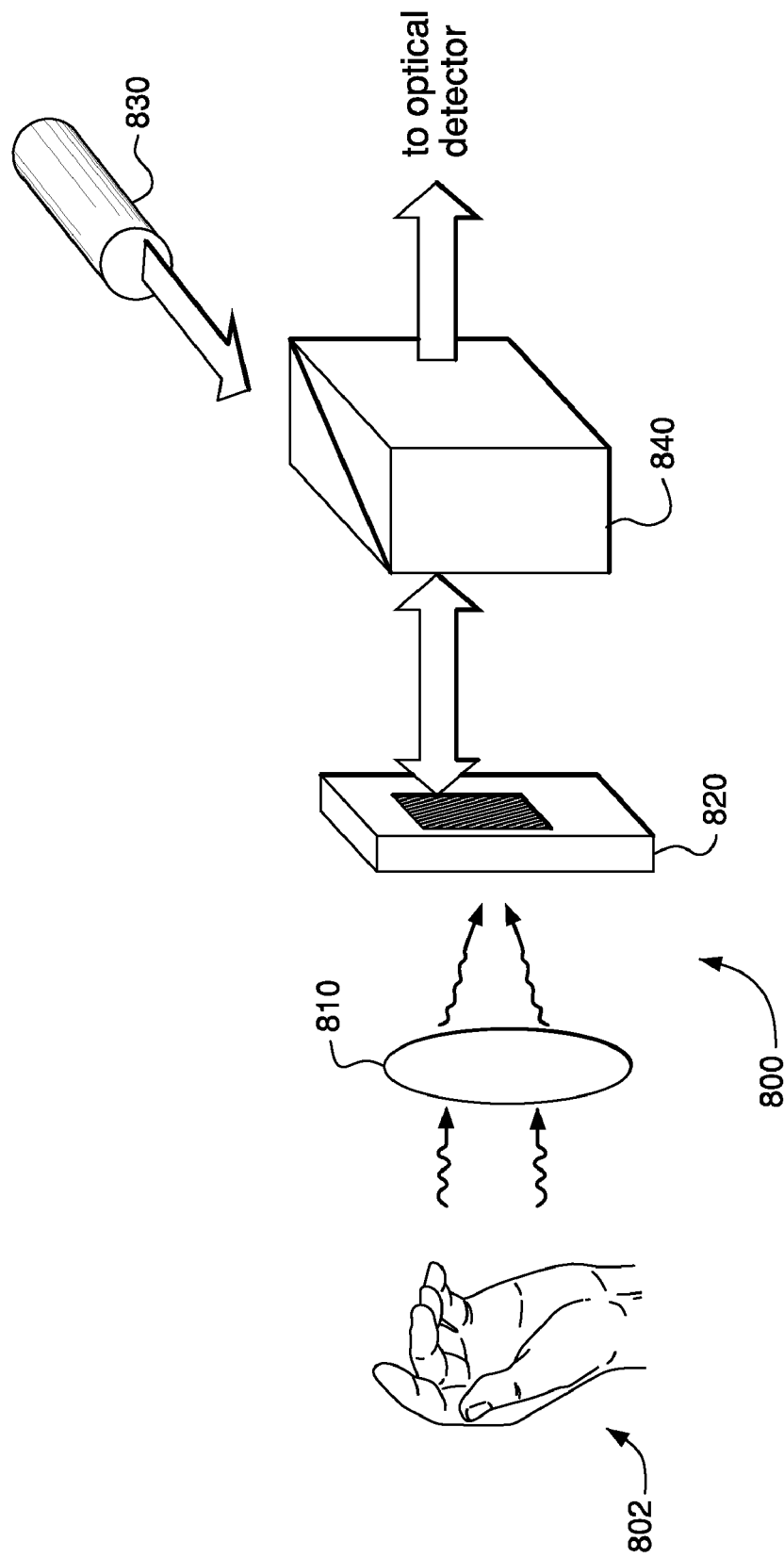
FIG. 8 illustrates a three-dimensional perspective view of an IR imaging system according to another embodiment.

FIG. 8 illustrates a three-dimensional perspective view of an IR imaging system 800 according to another embodiment. System 800 is generally similar to system 100 (FIG. 1). As such, system 800 has an IR lens 810 configured to project an image of object 802 (illustratively a human hand) onto an IR detector array 820. Array 820 has a plurality of pixels (not individually shown in FIG. 8), each pixel having a thermal IR detector, various embodiments of which are described in more detail below. IR detectors used in pixels of array 820 differ from those used in pixels of array 120 in that they enable optical readout of the IR image acquired by array 820. More specifically, a beam of light generated by a laser 830 is directed via a beam splitter 840 toward the backside of array 820. Hereafter, the term "backside" designates the side of an IR detector array that would face beam splitter 840 in system 800, while the term "front-side" designates the side of that IR detector array that would face lens 810. As explained in more detail below, backside reflection characteristics of each pixel in array 820 depend on the amount of IR radiation received by the pixel from object 802. As such, light reflected by array 820 toward beam splitter 840 becomes spatially modulated due to the varying reflection characteristics of different pixels in the array related to the respective amounts of IR radiation received by the pixel at the front side of the array. As a result, array 820 converts the IR image projected onto its front side into an optical (e.g., visible-light) representation of that image at the backside. The reflected light that passes beam splitter 840 is detected by an optical detector, which can be, for example, a CCD camera or a human eye. Advantageously, array 820 can be realized as a passive device, which does not consume any external electrical power or have any external electrical connections.

Figure 9A:
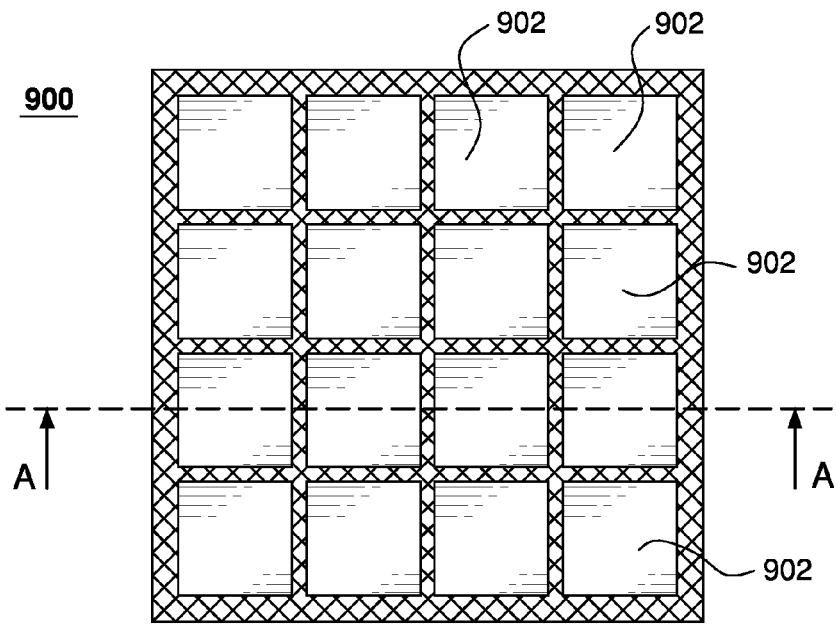
FIGS. 9A-D show an IR detector array that can be used in the system shown in FIG. 8 according to one embodiment.
Figure 9B:
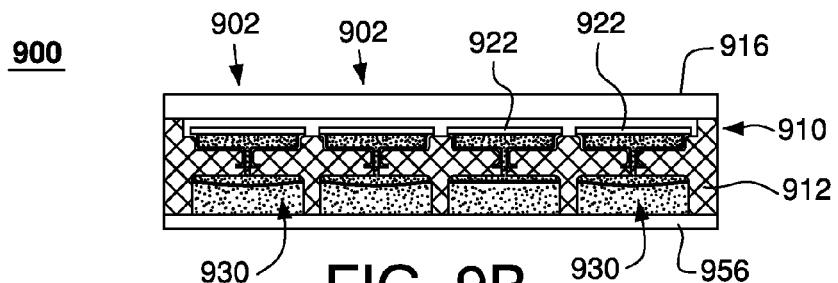
Figure 9C:
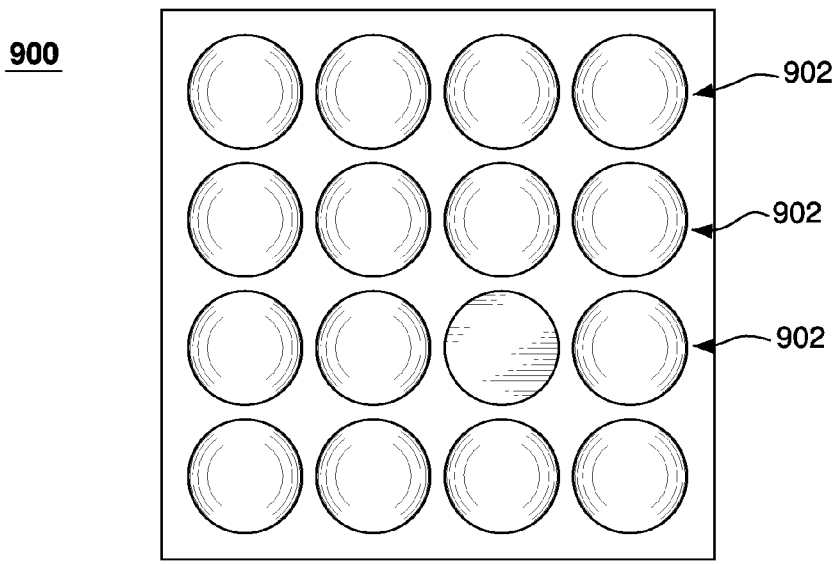
Figure 9D:
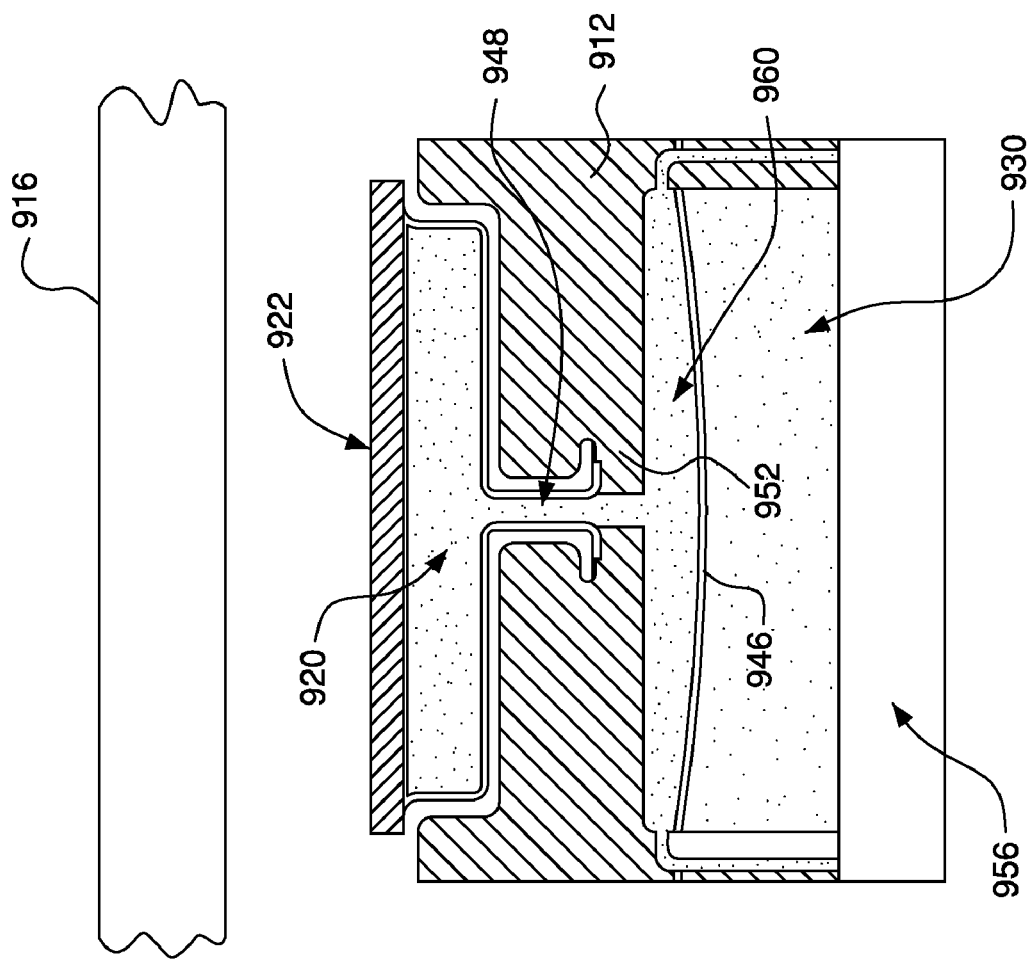

FIGS. 9A-D show an IR detector array 900 that can be used as array 820 according to one embodiment. More specifically, FIGS. 9A and 9C show front-side and backside views, respectively, of array 900. FIG. 9B shows a cross-sectional view of array 900 along the plane labeled AA in FIG. 9A. FIG. 9D shows a cross-sectional view of an individual pixel 902 of array 900. Illustratively, array 900 is shown as having sixteen pixels 902, each pixel having a rectangular shape. One skilled in the art will appreciate that, in other embodiments, a different number of pixels having other suitable shapes can be used.

Referring to FIG. 9B, pixels 902 of array 900 share an evacuated vessel 910 formed by an IR-transparent window 916 and a body 912 of the array, to which body that window is attached. Window 916 is generally analogous to each of windows 316 and 616 (FIGS. 3 and 6) and is adapted to transmit IR radiation, e.g., received by array 900 from object 802 (FIG. 8), to plates 922 of individual pixels 902, where that IR radiation is absorbed. An optical window 956, which is transparent to light generated by laser 830, serves as a wall for reference chambers 930 of pixels 902 (see also FIG. 9D). In one embodiment, reference chambers 930 of all pixels 902 in array 900 can be joined together to form one large common reference chamber for those pixels.

Referring now to FIG. 9D, each pixel 902 in array 900 has a sense chamber 920 and reference chamber 930 that are generally analogous to sense chamber 620 and reference chamber 630, respectively, of detector 600 (FIG. 6). More specifically, similar to sense chamber 620 and reference chamber 630, which share flexible diaphragm 646, sense chamber 920 and reference chamber 930 also share a flexible diaphragm 946. To reduce heat exchange between chambers 920 and 930 through diaphragm 946, sense chamber 920 has a relatively long and narrow tube 948 connecting the chamber's relatively large upper portion located near plate 922 with the chamber's relatively small lower portion located near diaphragm 946. Similar to tube 648 of sense chamber 620, tube 948 of sense chamber 920 enables pressure equalization between the upper and lower portions of the sense chamber, while substantially preserving any existing temperature differential between those portions.

Diaphragm 946 and a side 952 of body 912 form an optical resonator 960 that can be optically pumped through window 956 by probe light generated, e.g., by laser 830 (FIG. 8). Diaphragm 946 is partially transparent to the probe light and, as such, admits a portion of that light into optical resonator 960, while reflecting the other portion back toward window 956. The probe light admitted into optical resonator 960 reverberates between side 952 and diaphragm 946 until it leaks back out through the diaphragm. Depending on the distance between side 952 and diaphragm 946, the probe light leaking out of optical resonator 960 and the probe light directly reflected from the diaphragm can interfere constructively or destructively. In a case of full constructive interference, the reflection coefficient for optical resonator 960 can be close to 100% and the corresponding pixel will look relatively bright in reflected light. In a case of full destructive interference, the reflection coefficient for optical resonator 960 can be close to 0 and the corresponding pixel will look relatively dim in reflected light. For diaphragm positions between the positions corresponding to full constructive and full destructive interference, the reflection coefficient for optical resonator 960 will adopt intermediate values (between 0 and 100%), thereby providing a measure of deflection for diaphragm 946. Since the extent of deflection for diaphragm 946 in each individual pixel 902 is related to the amount of IR radiation received by that pixel at the front side of array 900, the probe-light reflection pattern exhibited by the array at its backside will be a representation of the front-side IR image.

In one embodiment, at equilibrium, the distance between diaphragm 946 and side 952 is an integer multiple of $\lambda/4$, where $\lambda$ is the wavelength of probe light. Also, the thickness of diaphragm 946 is an odd integer multiple of $\lambda/4n$, where n is the index of refraction of the diaphragm's material. For example, when $\lambda$=600 nm (red light) and diaphragm 946 is made of silicon nitride (n=2.0), the diaphragm can have a thickness of 0.08 µm and the distance between the diaphragm and side 952 can be 0.6 µm.

Figure 10A:
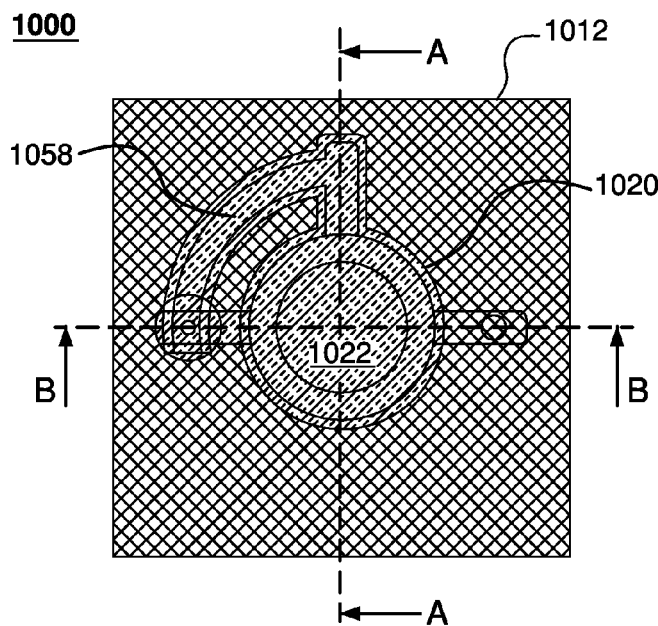
FIGS. 10A-C show a MEMS device that can be used in a pixel of the array shown in FIG. 9 according to another embodiment.
Figure 10B:
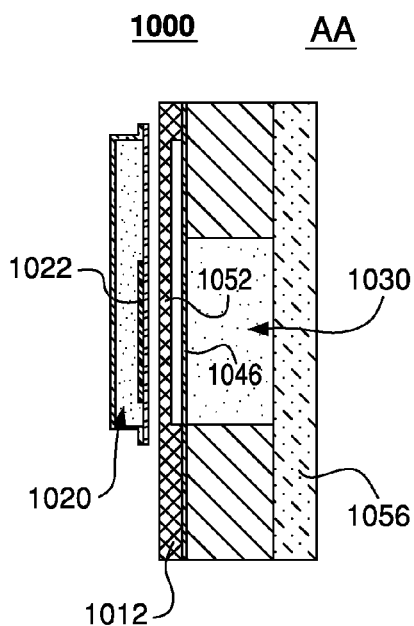
Figure 10C:
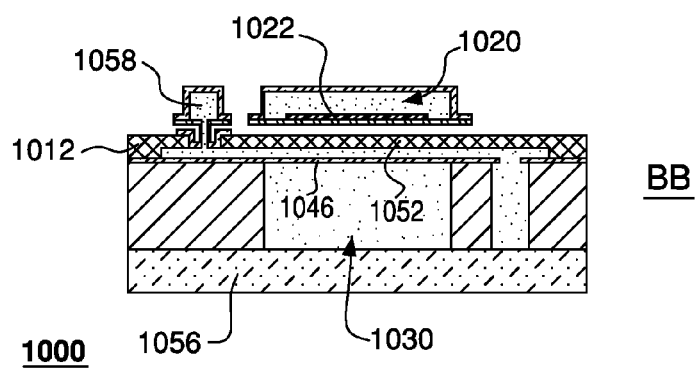

FIGS. 10A-C show a MEMS device 1000 that can be used in pixel 902 of array 900 (FIG. 9) according to another embodiment. More specifically, FIG. 10A shows a top view of device 1000, and FIGS. 10B-C shows two cross-sectional side views of that device along cross-section planes labeled AA and BB, respectively, in FIG. 10A. Device 1000 is generally similar to pixel 902, and analogous structural elements of the two devices are designated with labels having the same last two digits. The following portion of this specification primarily describes structural differences between pixel 902 and device 1000.

Sense chamber 1020 of device 1000 is analogous to sense chamber 920 of pixel 902. As such, sense chamber 1020 has a relatively large upper portion located near plate 1022 and a relatively small lower portion located near diaphragm 1046. However, a tube 1058 connecting the upper and lower portions of sense chamber 1020 differs from tube 948 of sense chamber 920 (FIG. 9) in that a significant portion of tube 1058 runs parallel to the plane of body 1012. In contrast, tube 948 is substantially orthogonal to the plane of body 912 and goes substantially straight down from the upper portion of sense chamber 920 to the lower portion of that chamber. The geometry of tube 1058 shown in FIG. 10 enables that tube to be relatively long, while the overall thickness of device 1000 remains relatively small. The relatively large length of tube 1058 might be advantageous because it improves thermal insulation between the upper and lower portions of sense chamber 1020, which can accordingly improve the sensitivity of device 1000. In addition, the ability to have a relatively small thickness for device 1000 can simplify its fabrication.

In reference to FIGS. 10B-C, it should be noted that plate 1022, which absorbs IR radiation received by device 1000, is located inside the upper portion of sense chamber 1020. Recall that, in pixel 902, plate 922, which absorbs IR radiation received by the pixel, serves as an external wall of sense chamber 920. The fact that plate 1022 is located inside the upper portion of sense chamber 1020 enables the walls of that portion to be made of a single material. The latter characteristic might be advantageous in terms of improving structural strength of wall junctions, which are typically stronger when pieces of the same material are joined together compared to when the wall is made up of pieces of two or more different materials. Higher structural strength might be important if gas pressure in sense chamber 1020 needs to be relatively high, e.g., greater than 2 atm.

Device Fabrication

FIGS. 11A-K illustrate representative fabrication steps for device 1000 (FIG. 10) according to one embodiment. More specifically, each of FIGS. 11A-G shows two views labeled (i) and (ii), respectively. Each view (i) is a top view of a multilayered wafer, using which device 1000 is being fabricated, at the corresponding fabrication step, whereas view (ii) is a cross-sectional side view of that wafer. Each of FIGS. 11H-K shows three views labeled (i), (ii), and (iii), respectively. Each view (i) is a top view of the multilayered wafer, and views (ii) and (iii) are cross-sectional side views of that wafer along two mutually orthogonal cross-section planes. The final structure of device 1000 manufactured using the fabrication process of FIGS. 11A-K is shown in FIG. 10, to which the description of FIGS. 11A-K provided below also refers.

Referring to FIGS. 11A(i)-(ii), fabrication of device 1000 begins with a silicon substrate 1102. First, a thin layer 1104 of slightly tensile silicon nitride is deposited over substrate 1102. Diaphragm 1046 will be made using layer 1104. Layer 1104 is patterned and etched to form one or more vias, only one of which, i.e., via 1132, is shown in FIG. 11A. The vias will be used to etch out silicon oxide (not formed yet) and enable release of the final structure of device 1000.

Referring to FIGS. 11B(i)-(ii), a layer 1106 of fast etching silicon oxide, preferably in form of phosphosilicate glass (PSG), is deposited over the structure of FIG. 11A. The thickness of layer 1106 will determine the thickness of the optical resonator formed by diaphragm 1046 and side 1052. Layer 1106 is patterned and etched as indicated in FIG. 11B.

Figure 11D:
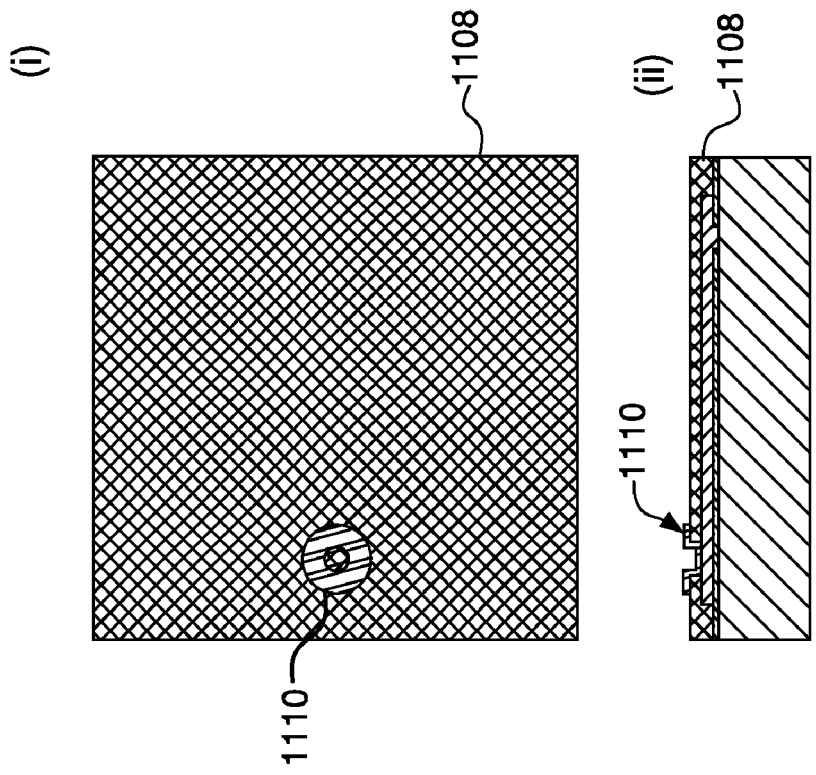
Figure 11C:
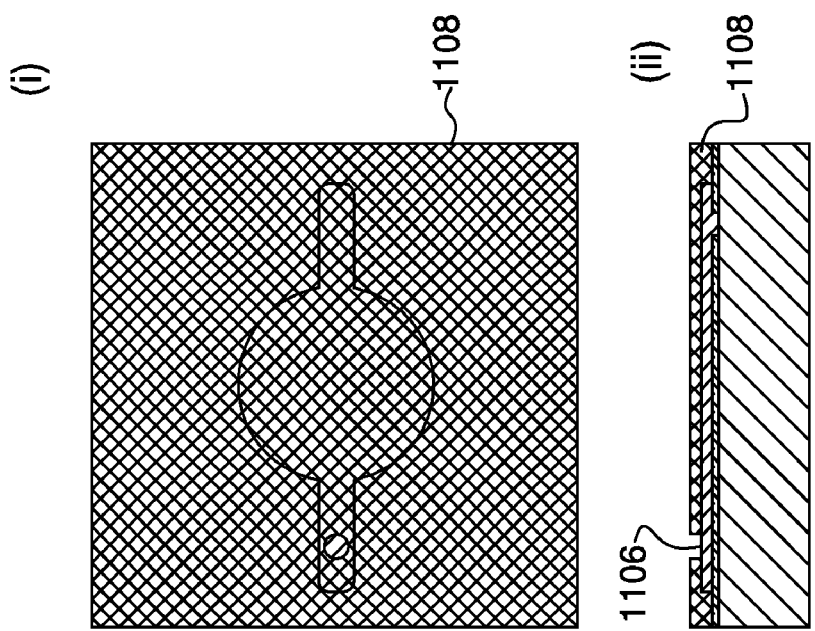

Referring to FIGS. 11C(i)-(ii), a layer 1108 of poly-silicon is deposited over the structure of FIG. 11B. Layer 1108 is used to create body 1012 and side 1052. Layer 1108 is patterned and etched as indicated in FIG. 11C, with layer 1106 acting as an etch stop.

Referring to FIGS. 11D(i)-(ii), a thin layer 1110 of silicon nitride is deposited over layer 1108. Layer 1110 is patterned and etched as indicated in FIG. 11D to create an etch stop for further fabrication processing.

Figure 11F:
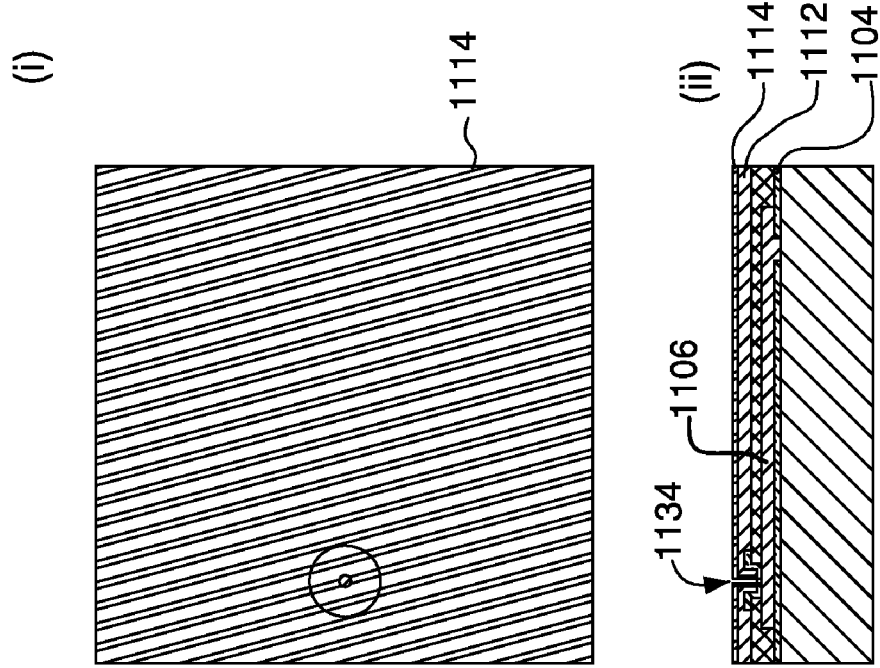
Figure 11E:
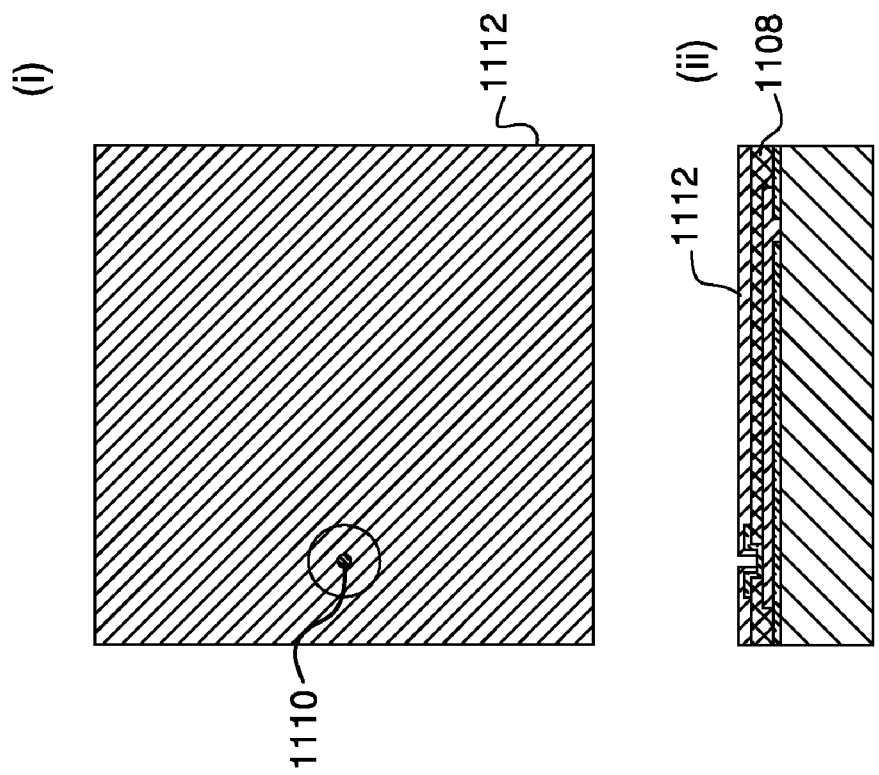

Referring to FIGS. 11E(i)-(ii), a layer 1112 of fast etching silicon oxide, e.g., PSG, is deposited over the structure of FIG. 11D. The thickness of layer 1112 will determine the separation between the upper and lower portions of sense chamber 1020. Layer 1112 is patterned and etched as indicated in FIG. 11E.

Referring to FIGS. 11F(i)-(ii), first, a layer 1114 of silicon nitride is deposited over the structure of FIG. 11E. Layer 1114 forms the bottom wall of the upper portion of sense chamber 1020. The thickness of layer 1114 is greater than that of layer 1104 to enable diaphragm 1046 (rather than the bottom wall of the upper portion of sense chamber 1020) to bulge out in response to IR radiation received by the sense chamber. Layers 1114 and 1110 are then etched all the way through to layer 1106 to create a vertical channel 1134 connecting tube 1058 and the lower portion of sense chamber 1020.

Referring to FIGS. 11G(i)-(ii), first channel 1134 is filled with silicon oxide. Then, a layer 1116 of IR absorbing material is deposited over layer 1114. Layer 1116 is patterned and etched to form plate 1022.

Referring to FIGS. 11H(i)-(iii), a layer 1118 of fast etching silicon oxide, preferably PSG, is deposited over the structure of FIG. 11G. Layer 1118 is patterned and etched as indicated in FIG. 11H to define the outlines of tube 1058 and the upper portion of sense chamber 1020. Depending on the size and weight of the upper portion of sense chamber 1020, more than one tube analogous to tube 1058 might be needed to mechanically support that portion in the final structure of device 1000. In that case, layer 1118 is appropriately patterned to define two or more tubes analogous to tube 1058.

Figure 11J:
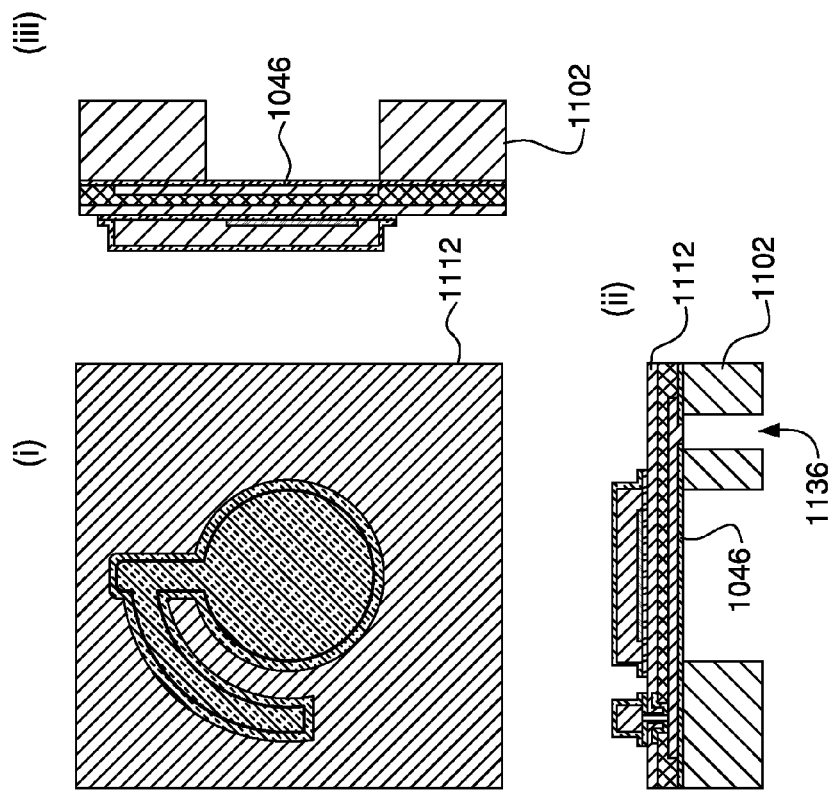
Figure 11I:
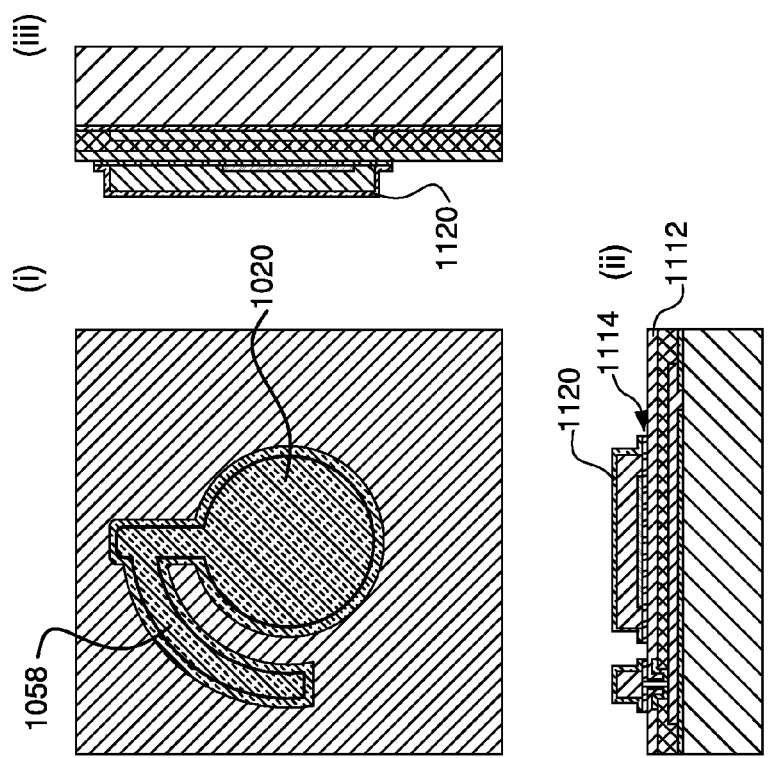

Referring to FIGS. 11I(i)-(iii), a layer 1120 of silicon nitride is deposited over the structure of FIG. 11H. Layers 1120 and 1114 are then patterned and etched as indicated in FIG. 11I. Tube 1058 and the upper portion of sense chamber 1020 have now been formed.

Referring to FIGS. 11J(i)-(iii), substrate 1102 is patterned and etched to create an opening for reference chamber 1030 and to form a release port 1136. Release port 1136 serves to deliver an etchant to the interior of sense chamber 1020 during the release step of this fabrication process. Note that diaphragm 1046 is now exposed through the opening formed for reference chamber 1030.

Figure 11K:
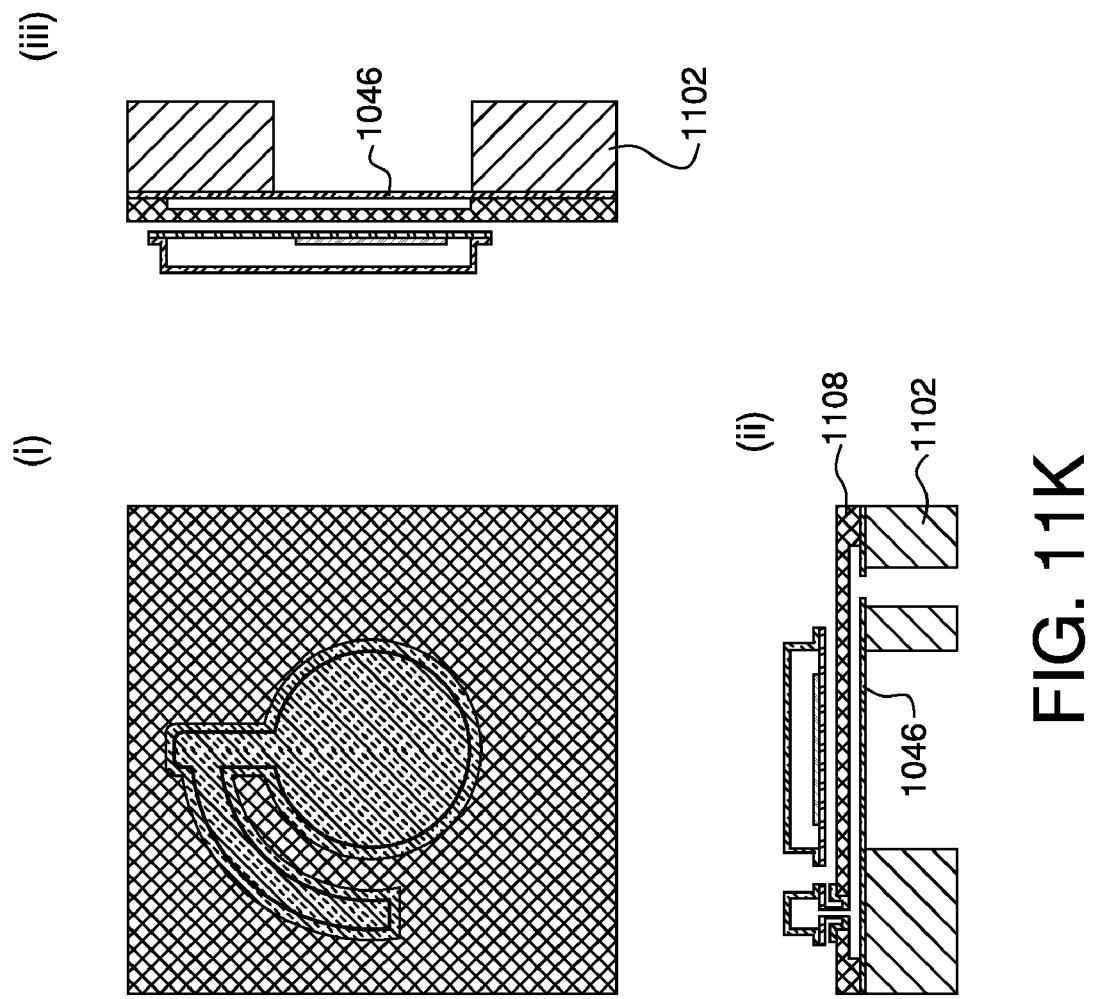

Referring to FIGS. 11K(i)-(iii), all exposed silicon oxide is etched away to release the penultimate structure of device 1000. More specifically, an appropriate etchant is delivered through port 1136 to remove the silicon oxide from the interior of sense chamber 1020, and layer 1112 is etched away. The structure of FIG. 11K is then placed in an inert gas atmosphere and bonded to window 1056 to produce the structure shown in FIG. 10. The bonding of window 1056 to substrate 1102 seals and separates sense chamber 1020 and reference chamber 1030. An IR-transparent cover (not shown) might then be bonded under vacuum to the top surface of layer 1108 to create an evacuated vessel analogous to vessel 910 shown in FIG. 9B.

FIGS. 12A-M illustrate representative fabrication steps for device 700 (FIG. 7) according to one embodiment. Device 700 is formed by bonding together two multilayered wafers, i.e., a wafer 1260 shown in FIG. 12G and a wafer 1280 shown in FIG. 12M. FIGS. 12A-G illustrate fabrication steps corresponding to wafer 1260, while FIGS. 12H-M illustrate fabrication steps corresponding to wafer 1280. Each of FIGS. 12A-G shows three views labeled (i), (ii), and (iii), respectively. Each view (i) is a top view of wafer 1260 at the corresponding fabrication step, whereas views (ii) and (iii) are cross-sectional side views of that wafer along two cross-section planes, one of which runs through the center of the square shown in view (i) parallel to the bottom side of that square, and the other plane runs along a diagonal of that square. Each of FIGS. 12H-M shows two views labeled (i) and (ii), respectively. Each view (i) is a top view of wafer 1280, and view (ii) is a cross-sectional side view of that wafer along a diagonal of the square shown in view (i). The final structure of device 700 obtained using the fabrication process of FIGS. 12A-M is shown in FIG. 7, to which the description of FIGS. 12A-M provided below also refers.

Referring to FIGS. 12A(i)-(iii), processing of wafer 1260 begins with a silicon substrate 1262 having contact pads 1242a-b and 742c. Substrate 1262 is covered with a layer 1264 of silicon nitride. Vias are etched in layer 1264 as shown in FIG. 12A to expose the contact pads.

Referring to FIGS. 12B(i)-(iii), a layer 1266 of (low temperature) germanium-silicon is deposited over the structure of FIG. 12A. Layer 1266 is patterned and etched as indicated in FIG. 12B to form capacitor plate 754, create an isolated contact post 1202, and define an etch channel 1204. Note that capacitor plate 754 is electrically connected to contact pad 742c. If necessary, the structure of FIG. 12B can incorporate several etch channels analogous to etch channel 1204 to efficiently deliver an etchant to the interior of reference chamber 730 during the respective release step of this fabrication process.

Figures 12C, 12D:
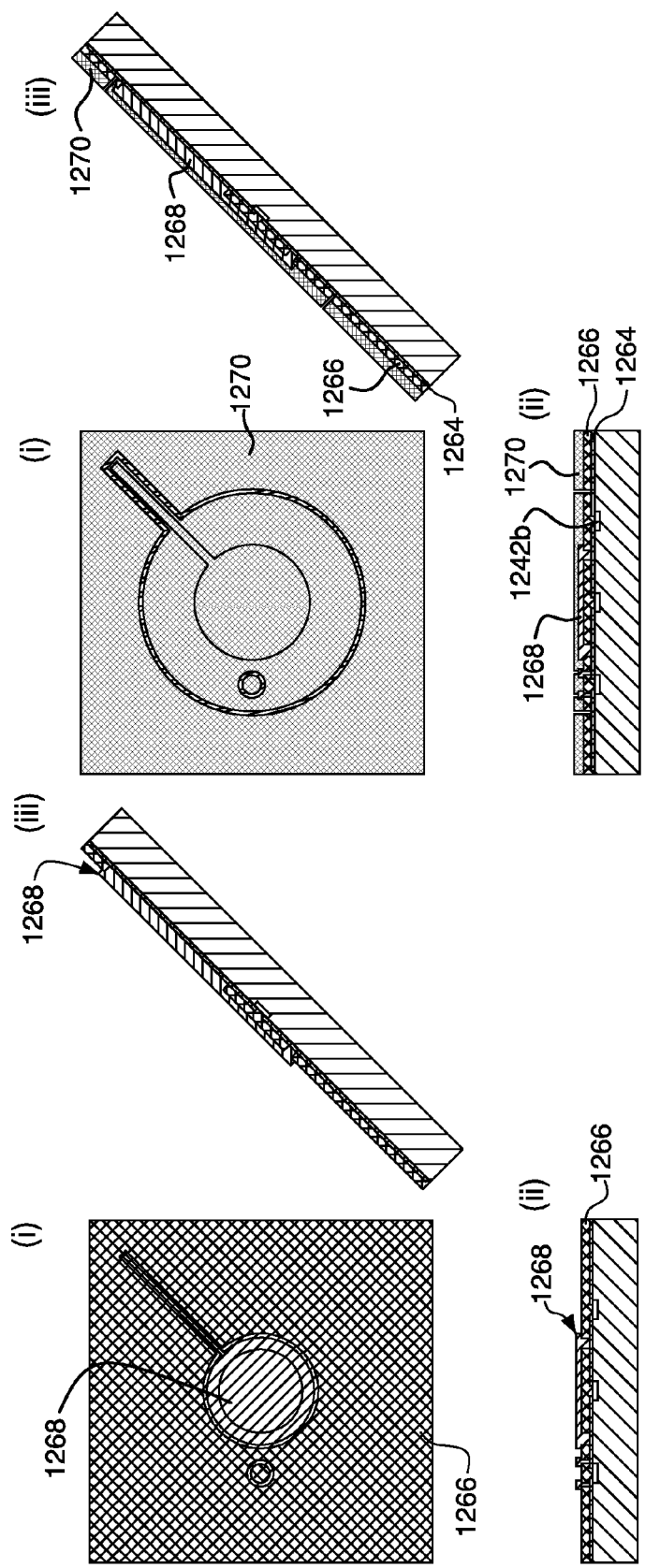

Referring to FIGS. 12C(i)-(iii), a layer 1268 of PSG is deposited over the structure of FIG. 12B. Layer 1268 defines the size of the gap between capacitor plate 754 and diaphragm 756. Layer 1268 is patterned and etched as indicated in FIG. 12C.

Referring to FIGS. 12D(i)-(iii), a layer 1270 of germanium-silicon is deposited over the structure of FIG. 12C. Since diaphragm 746 is formed using layer 1270, the thickness of this layer determines the thickness of the diaphragm and influences the sensitivity of device 700. Layer 1270 is patterned and etched as indicated in FIG. 12D, with layers 1264 and 1268 acting as etch stops. Note that diaphragm 746 is now electrically connected to contact pad 1242b.

Figures 12E, 12F:
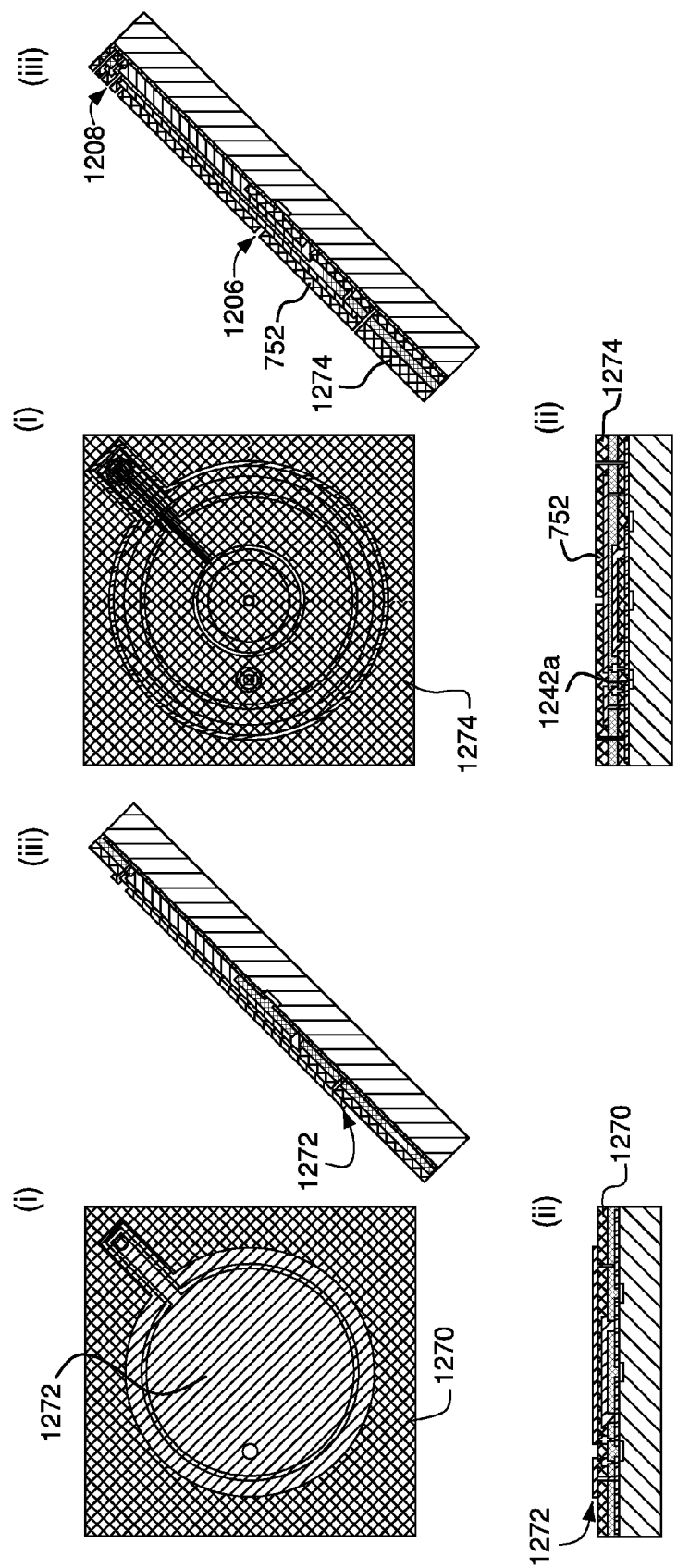

Referring to FIGS. 12E(i)-(iii), a layer 1272 of fast etching silicon oxide, e.g., PSG, is deposited over the structure of FIG. 12D. Layer 1272 defines the gap size for the capacitor formed by diaphragm 746 and capacitor plate 752. Layer 1272 is patterned and etched as indicated in FIG. 12E.

Referring to FIGS. 12F(i)-(iii), a layer 1274 of germanium-silicon is deposited over the structure of FIG. 12E. Layer 1274 is patterned and etched as indicated in FIG. 12F to define capacitor plate 752 and vias 1206 and 1208 serving to provide access to layers 1272 and 1268, respectively. Note that capacitor plate 752 is electrically connected to contact pad 1242a. If necessary, more vias analogous to vias 1206 and 1208 can be formed to aid in the subsequent release process.

Figure 12G:
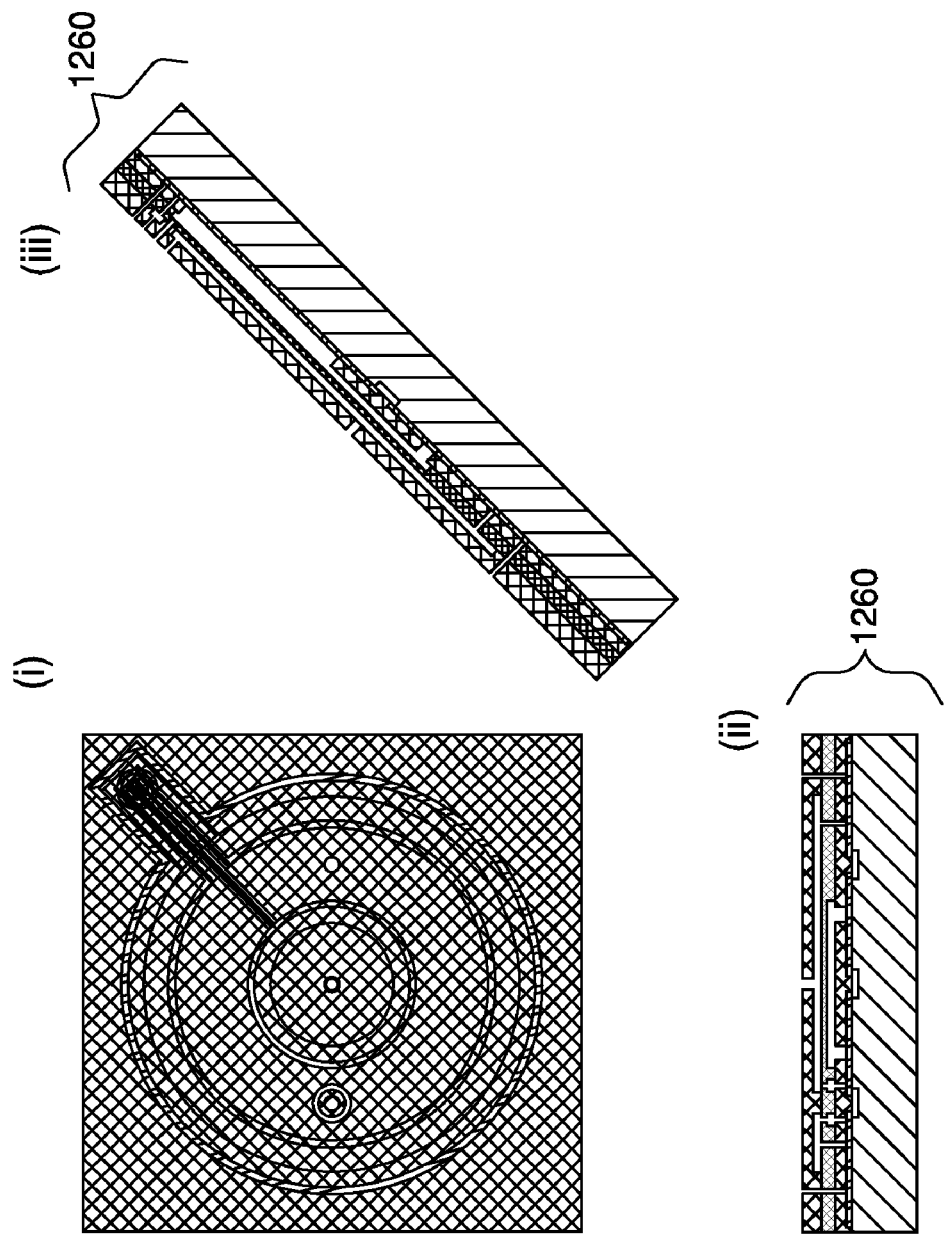

Referring to FIGS. 12G(i)-(iii), all exposed silicon oxide is etched away to produce the final structure of wafer 1260. More specifically, an appropriate etchant is delivered through vias 1206 and 1208 to remove silicon oxide from the interior of the lower portion of sense chamber 720 and from reference chamber 730.

Figure 12I:
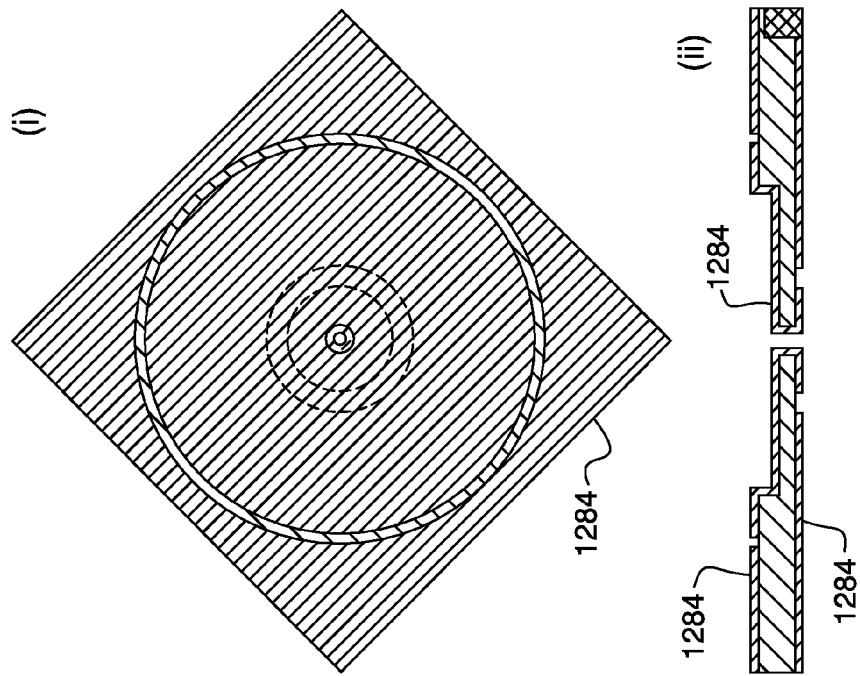
Figure 12H:
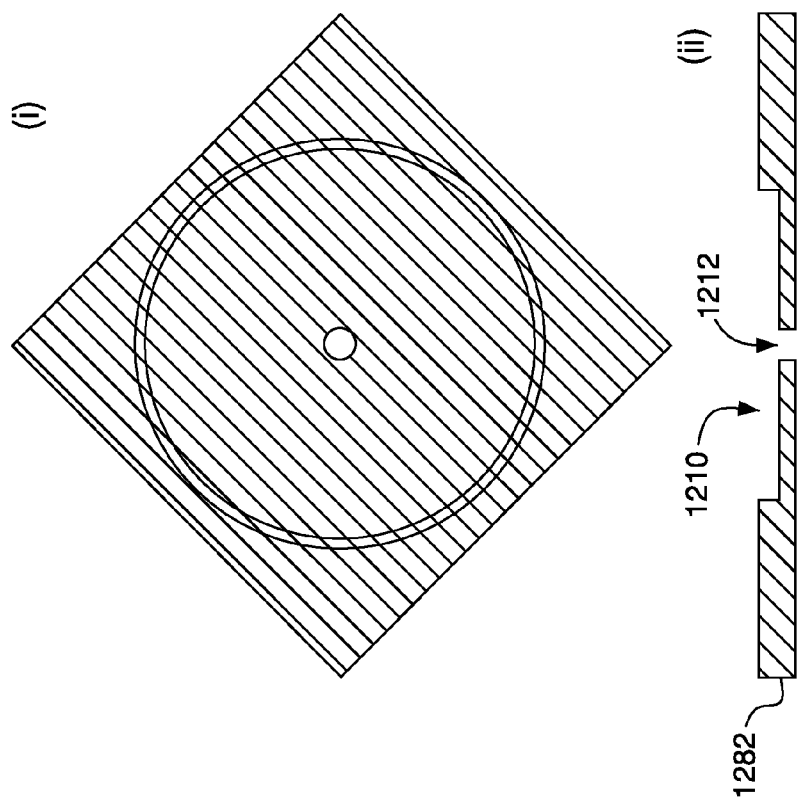

Referring to FIGS. 12H(i)-(ii), processing of wafer 1280 begins with a silicon substrate 1282. Using a two-step etching process, a cylindrical chamber 1210 and a central hole 1212 are formed in substrate 1282. The thickness of the bottom plate of cylindrical chamber 1210 determines (in part) the degree of thermal isolation between sense chamber 720 and reference pressure chamber 730.

Referring to FIGS. 12I(i)-(ii), the structure of FIG. 12H is (all-around) covered with a layer 1284 of PSG. Top and bottom portions of layer 1284 are patterned as indicated to create trenches. These trenches will be used to create etch stops for the release process corresponding to wafer 1280.

Figure 12K:
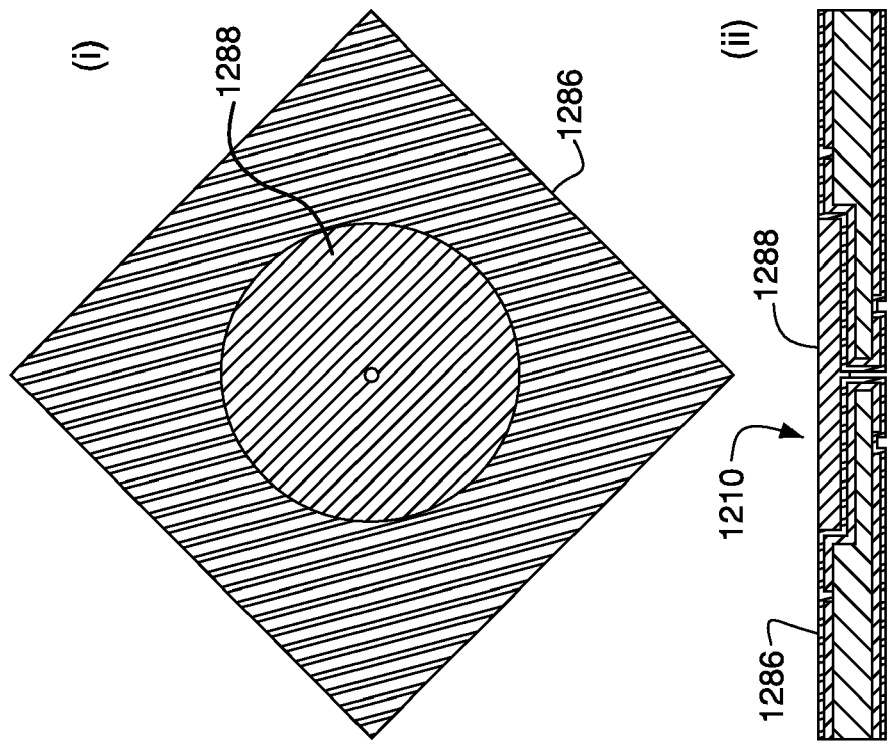
Figure 12J:
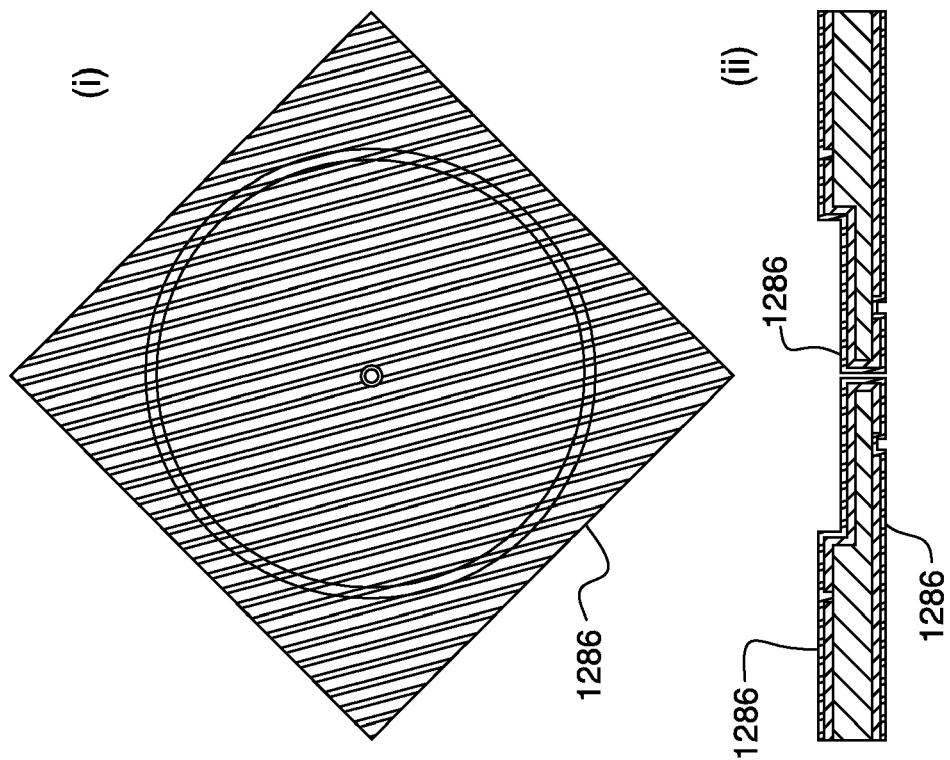

Referring to FIGS. 12J(i)-(ii), the structure of FIG. 12I is (all-around) covered with a layer 1286 of silicon nitride. Layer 1286 is thicker than diaphragm 746 to enable appropriate bulging of the diaphragm in response to IR radiation received by device 700.

Referring to FIGS. 12K(i)-(ii), cylindrical chamber 1210 is filled up with a layer 1288 of PSG. Layer 1288 is subjected to chemical-mechanical polishing to make it flush with the top surface of layer 1286.

Figure 12M:
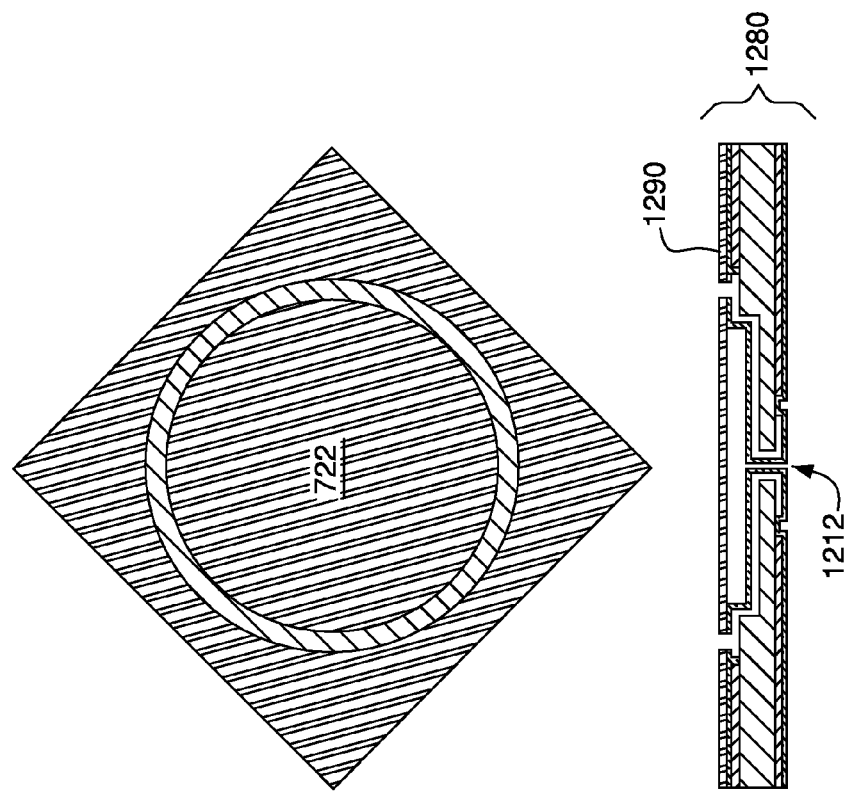
Figure 12L:
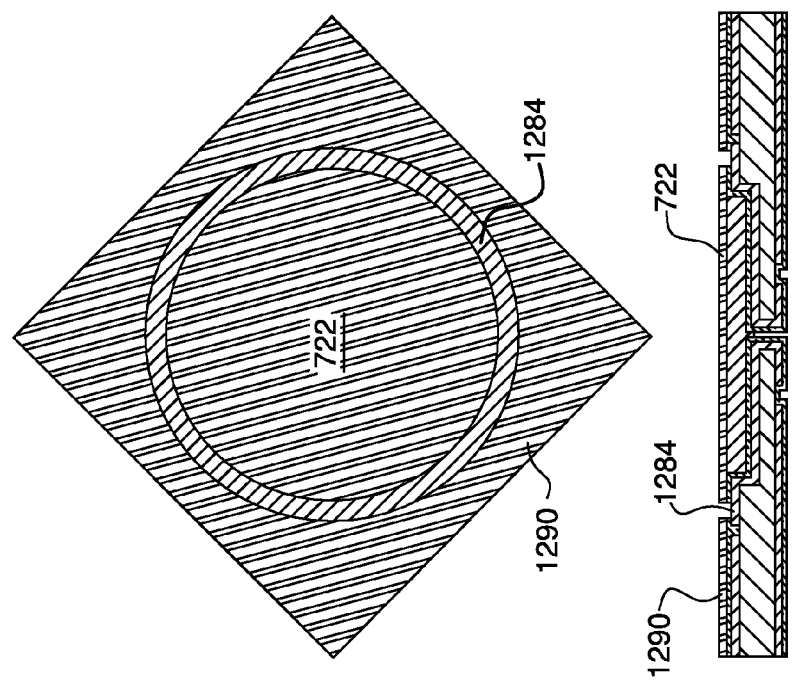

Referring to FIGS. 12L(i)-(ii), first, a layer 1290 of silicon nitride is deposited over the structure of FIG. 12K. Then, layer 1290 is patterned and etched to define sense chamber 720 and to provide access to layer 1284. Finally, an IR absorbing material (not shown) is deposited over plate 722.

Referring to FIGS. 12M(i)-(ii), all exposed silicon oxide is etched away to produce the final structure of wafer 1280. More specifically, layers 1284 and 1288 are etched away, with the etchant for layer 1288 being delivered through hole 1212.

Referring now to FIGS. 7B, 12G, and 12M, wafers 1260 and 1280 are bonded together in a gas (e.g., Ar) atmosphere to produce device 700. The wafer bond seals and separates sense chamber 720 and reference chamber 730. An IR-transparent cover (not shown) might then be bonded under vacuum to layer 1290 to create an evacuated vessel analogous to vessel 610 shown in FIG. 6.

While this invention has been described with reference to illustrative embodiments, this description is not intended to be construed in a limiting sense. Various surfaces may be modified, e.g., by metal deposition for enhanced reflectivity, IR absorption, and/or electrical conductivity, or by ion implantation for enhanced mechanical strength. Differently shaped chambers, tubes, channels, plates, posts, diaphragms, beams, electrodes, and/or pads may be implemented without departing from the scope and principle of the invention. Reference and sense chambers of the invention can be filled with any suitable fluids, e.g., gases, liquids, or mixtures thereof. Devices and systems of the invention can be configured to operate with CW or pulsed light. Integrated devices of the invention can be formed using one, two or more wafers secured together. Although detectors of the invention have been described in reference to IR radiation, they can similarly be configured to detect other radiation types, e.g., visible light, X-rays, or corpuscular radiation. Various modifications of the described embodiments, as well as other embodiments of the invention, which are apparent to persons skilled in the art to which the invention pertains are deemed to lie within the principle and scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where a wafer is horizontal, but would be horizontal where the wafer is vertical, and so on. Similarly, while many figures show the different structural layers as horizontal layers, such orientation is for descriptive purpose only and not to be construed as a limitation.

The invention claimed is:

1. Apparatus, comprising one or more radiation detectors, wherein at least one radiation detector comprises:
   a sense chamber; and
   a reference chamber mechanically coupled to the sense chamber, wherein:
      the sense chamber is adapted to (i) expand in response to receiving infrared (IR) radiation therein and (ii) change volume of the reference chamber due to said expansion and said mechanical coupling; and
      the reference chamber is adapted to restrain said expansion, wherein a volume change with respect to an equilibrium volume for the sense chamber provides a measure of the amount of the IR radiation received; and
   an evacuated vessel that contains at least a portion of the sense chamber.

2. The invention of claim 1, wherein:
   the sense chamber comprises a first flexible diaphragm;
   the at least one radiation detector further comprises a conductive plate, wherein the first flexible diaphragm and said conductive plate form a first capacitor;
   the volume change causes a capacitance change for the first capacitor; and
   the apparatus comprises a circuit adapted to measure said capacitance change to obtain said measure of the received IR radiation.

3. The invention of claim 2, wherein:
   the reference chamber comprises a second flexible diaphragm; and
   the at least one radiation detector further comprises a beam coupled between the first and second diaphragms to provide said mechanical coupling.

4. The invention of claim 3, wherein:
   the conductive plate and the second flexible diaphragm form a second capacitor; and
   the volume change causes a capacitance change for the second capacitor.

5. The invention of claim 1, wherein a flexible diaphragm serves as a part of a common wall for the sense and reference chambers and is adapted to provide said mechanical coupling.

6. The invention of claim 5, wherein:
   the at least one radiation detector further comprises a first conductive plate;
   the diaphragm and said first conductive plate form a first capacitor;
   the volume change causes a capacitance change for the first capacitor; and
   the apparatus comprises a circuit adapted to measure said capacitance change to obtain said measure of the received IR radiation.

7. The invention of claim 6, wherein:
   the at least one radiation detector further comprises a second conductive plate;
   the diaphragm and said second conductive plate form a second capacitor; and
   the volume change causes a capacitance change for the second capacitor.

8. The invention of claim 1, wherein:
   the sense chamber comprises first and second portions; and
   the first portion comprises a radiation absorber adapted to absorb the received IR radiation, wherein:
      the absorbed radiation causes a temperature increase within the first portion; and
      said first and second portions are thermally insulated from one another to inhibit heat transfer from the first portion to the second portion.

9. The invention of claim 8, wherein the first and second portions are connected by a tube.

10. The invention of claim 9, wherein:
    the at least one radiation detector is fabricated using a substantially planar wafer; and
    the tube is substantially parallel to the plane of said planar wafer.

11. The invention of claim 1, wherein the at least one radiation detector comprises an optical resonator, whose reflection characteristics are controlled by said volume change.

12. The invention of claim 11, further comprising a light source adapted to illuminate the optical resonator with light, wherein the intensity of light reflected by the optical resonator serves as said measure of the received IR radiation.

13. The invention of claim 11, wherein:
    a flexible diaphragm serves as a part of a common wall for the sense and reference chambers and is adapted to provide said mechanical coupling; and
    the flexible diaphragm and a side of the sense chamber define said optical resonator.

14. The invention of claim 1, wherein the sense and reference chambers are filled with gas.

15. The invention of claim 1, wherein the evacuated vessel contains at least the sense chamber.

16. The invention of claim 1, comprising an array of radiation detectors having said at least one radiation detector, wherein the array is adapted to:

receive an infrared image of an object, with each radiation detector in the array receiving radiation corresponding to a respective portion of said infrared image, and generate a plurality of signals, with each of said signals being generated by a respective radiation detector and representing a measure of infrared radiation for the respective portion of said infrared image.

17. The invention of claim 16, wherein said signals are optical signals.

18. A method of detecting radiation, comprising:

detecting a volume change with respect to an equilibrium volume for a sense chamber in a device having a reference chamber mechanically coupled to the sense chamber, wherein:

the sense chamber is adapted to (i) expand in response to receiving infrared (IR) radiation therein and (ii) change volume of the reference chamber due to said expansion and said mechanical coupling;

the reference chamber is adapted to restrain said expansion, wherein the volume change provides a measure of the amount of the IR radiation received; and the device comprises an evacuated vessel that contains at least a portion of the sense chamber.

19. The invention of claim 18, wherein:

the device comprises a capacitor, wherein the volume change causes a capacitance change for the capacitor; and the method comprises measuring said capacitance change to obtain said measure of the received IR radiation.

20. The invention of claim 18, wherein:

the device comprises an optical resonator, whose reflection characteristics are controlled by said volume change; and the method comprises reflecting light from the optical resonator, wherein the intensity of reflected light serves as said measure of the received IR radiation.

21. Apparatus, comprising one or more radiation detectors, wherein at least one radiation detector comprises:

a sense chamber; and a reference chamber mechanically coupled to the sense chamber, wherein:

the sense chamber is adapted to (i) expand in response to receiving infrared (IR) radiation therein and (ii) change volume of the reference chamber due to said expansion and said mechanical coupling;

the reference chamber is adapted to restrain said expansion, wherein a volume change with respect to an equilibrium volume for the sense chamber provides a measure of the amount of the IR radiation received;

the sense chamber comprises first and second portions;

the first portion comprises a radiation absorber adapted to absorb the received IR radiation;

the absorbed radiation causes a temperature increase within the first portion; and said first and second portions are thermally insulated from one another to inhibit heat transfer from the first portion to the second portion.

22. The invention of claim 21, wherein the first and second portions are connected by a tube.

23. The invention of claim 22, wherein:

the at least one radiation detector is fabricated using a substantially planar wafer; and the tube is substantially parallel to the plane of said planar wafer.

24. Apparatus, comprising one or more radiation detectors, wherein at least one radiation detector comprises:

a sense chamber; and a reference chamber mechanically coupled to the sense chamber, wherein:

the sense chamber is adapted to (i) expand in response to receiving infrared (IR) radiation therein and (ii) change volume of the reference chamber due to said expansion and said mechanical coupling; and the reference chamber is adapted to restrain said expansion, wherein a volume change with respect to an equilibrium volume for the sense chamber provides a measure of the amount of the IR radiation received;

an optical resonator, whose reflection characteristics are controlled by said volume change, wherein:

a flexible diaphragm serves as a part of a common wall for the sense and reference chambers and is adapted to provide said mechanical coupling; and the flexible diaphragm and a side of the sense chamber define said optical resonator.

* * * * *